US012491316B2

(12) United States Patent
Alles et al.

(10) Patent No.: US 12,491,316 B2
(45) Date of Patent: Dec. 9, 2025

(54) SCHEDULING OF MEDICAMENT BOLUS DELIVERIES BY A MEDICAMENT DELIVERY DEVICE AT FUTURE DATES AND TIMES WITH A COMPUTING DEVICE

(71) Applicant: Insulet Corporation, Acton, MA (US)

(72) Inventors: Matthew Alles, Winchester, MA (US); Daniel Murray, Sudbury, MA (US); Joon Bok Lee, Acton, MA (US); Jason O'Connor, Acton, MA (US)

(73) Assignee: INSULET CORPORATION, Acton, MA (US)

( * ) Notice: Subject to any disclaimer, the term of this patent is extended or adjusted under 35 U.S.C. 154(b) by 362 days.

(21) Appl. No.: 17/555,040

(22) Filed: Dec. 17, 2021

(65) Prior Publication Data

US 2022/0199215 A1 Jun. 23, 2022

Related U.S. Application Data

(60) Provisional application No. 63/228,415, filed on Aug. 2, 2021, provisional application No. 63/127,218, filed on Dec. 18, 2020.

(51) Int. Cl.
*A61M 5/172* (2006.01)
*A61J 7/04* (2006.01)
(Continued)

(52) U.S. Cl.
CPC .......... *A61M 5/1723* (2013.01); *A61J 7/0481* (2013.01); *G04G 9/007* (2013.01);
(Continued)

(58) Field of Classification Search
CPC ............ A61M 5/1723; A61M 2205/18; A61M 2205/505; A61M 2230/201; A61J 7/0481;
(Continued)

(56) References Cited

U.S. PATENT DOCUMENTS

| 445,545 A | 2/1891 | Crane |
| 588,583 A | 8/1897 | Lade |

(Continued)

FOREIGN PATENT DOCUMENTS

| CN | 101208699 A | 6/2008 |
| DE | 4200595 A1 | 7/1993 |

(Continued)

OTHER PUBLICATIONS

Andrenko et al., "EM Analysis of PBG Substrate Microstrip Circuits for Integrated Transmitter Front End" MMET Proceedings, 295-297 (2000).

(Continued)

*Primary Examiner* — Ryan W Sherwin
(74) *Attorney, Agent, or Firm* — GOODWIN PROCTER LLP

(57) ABSTRACT

Exemplary embodiments may enable a user to schedule medicament bolus deliveries, such as insulin boluses, for future dates and times. The exemplary embodiments may provide the ability to delay a scheduled medicament bolus delivery by short periods of time. The user may reschedule a scheduled medicament bolus delivery by entering a new date and/or time for the medicament bolus delivery. Still further, a user may cancel a scheduled medicament bolus delivery. In addition, exemplary embodiments may enable multiple medicament bolus deliveries to be viewed and managed.

15 Claims, 23 Drawing Sheets

(51) Int. Cl.
*G04G 9/00* (2006.01)
*G16H 20/13* (2018.01)

(52) U.S. Cl.
CPC ......... *G16H 20/13* (2018.01); *A61M 2205/18* (2013.01); *A61M 2205/505* (2013.01); *A61M 2230/201* (2013.01)

(58) Field of Classification Search
CPC ........ G04G 9/007; G16H 20/13; G16H 20/17; G16H 40/63; G16H 20/10; G16H 10/60
See application file for complete search history.

(56) References Cited

U.S. PATENT DOCUMENTS

| | | |
|---|---|---|
| 1,441,508 A | 1/1923 | Jensen |
| 2,283,925 A | 5/1942 | Harvey |
| 2,886,529 A | 5/1959 | Guillaud |
| 3,574,114 A | 4/1971 | Monforte |
| 3,614,554 A | 10/1971 | Shield |
| 3,885,662 A | 5/1975 | Schaefer |
| 3,983,077 A | 9/1976 | Fuller et al. |
| 4,108,177 A | 8/1978 | Pistor |
| 4,268,150 A | 5/1981 | Chen |
| 4,313,439 A | 2/1982 | Babb et al. |
| 4,400,683 A | 8/1983 | Eda et al. |
| 4,424,720 A | 1/1984 | Bucchianeri |
| 4,435,173 A | 3/1984 | Siposs et al. |
| 4,498,843 A | 2/1985 | Schneider et al. |
| 4,507,115 A | 3/1985 | Kambara et al. |
| 4,523,170 A | 6/1985 | Huth, III |
| 4,551,134 A | 11/1985 | Slavik et al. |
| 4,562,751 A | 1/1986 | Nason et al. |
| 4,585,439 A | 4/1986 | Michel |
| 4,601,707 A | 7/1986 | Albisser et al. |
| 4,634,427 A | 1/1987 | Hannula et al. |
| 4,646,038 A | 2/1987 | Wanat |
| 4,678,408 A | 7/1987 | Nason et al. |
| 4,684,368 A | 8/1987 | Kenyon |
| 4,755,169 A | 7/1988 | Sarnoff et al. |
| 4,759,120 A | 7/1988 | Bernstein |
| 4,859,492 A | 8/1989 | Rogers, Jr. et al. |
| 4,880,770 A | 11/1989 | Mir et al. |
| 4,898,578 A | 2/1990 | Rubalcaba, Jr. |
| 4,898,579 A | 2/1990 | Groshong et al. |
| 4,944,659 A | 7/1990 | Labbe et al. |
| 4,967,201 A | 10/1990 | Rich, III |
| 4,969,874 A | 11/1990 | Michel et al. |
| 5,007,458 A | 4/1991 | Marcus et al. |
| 5,062,841 A | 11/1991 | Siegel |
| 5,084,749 A | 1/1992 | Losee et al. |
| 5,130,675 A | 7/1992 | Sugawara |
| 5,139,999 A | 8/1992 | Gordon et al. |
| 5,154,973 A | 10/1992 | Imagawa et al. |
| 5,189,609 A | 2/1993 | Tivig et al. |
| 5,198,824 A | 3/1993 | Poradish |
| 5,205,819 A | 4/1993 | Ross et al. |
| 5,213,483 A | 5/1993 | Flaherty et al. |
| 5,217,754 A | 6/1993 | Santiago-Aviles et al. |
| 5,219,377 A | 6/1993 | Poradish |
| 5,254,096 A | 10/1993 | Rondelet et al. |
| 5,261,882 A | 11/1993 | Sealfon |
| 5,263,198 A | 11/1993 | Geddes et al. |
| 5,272,485 A | 12/1993 | Mason et al. |
| 5,281,202 A | 1/1994 | Weber et al. |
| 5,346,476 A | 9/1994 | Elson |
| 5,364,342 A | 11/1994 | Beuchat et al. |
| 5,403,797 A | 4/1995 | Ohtani et al. |
| 5,427,988 A | 6/1995 | Sengupta et al. |
| 5,433,710 A | 7/1995 | VanAntwerp et al. |
| 5,456,945 A | 10/1995 | McMillan et al. |
| 5,478,610 A | 12/1995 | Desu et al. |
| 5,513,382 A | 4/1996 | Agahi-Kesheh et al. |
| 5,535,445 A | 7/1996 | Gunton |
| 5,540,772 A | 7/1996 | McMillan et al. |
| 5,543,773 A | 8/1996 | Evans et al. |
| 5,582,593 A | 12/1996 | Hultman |
| 5,584,053 A | 12/1996 | Kommrusch et al. |
| 5,590,387 A | 12/1996 | Schmidt et al. |
| 5,614,252 A | 3/1997 | McMillan et al. |
| 5,625,365 A | 4/1997 | Tom et al. |
| 5,635,433 A | 6/1997 | Sengupta |
| 5,637,095 A | 6/1997 | Nason et al. |
| 5,665,070 A | 9/1997 | McPhee |
| 5,707,459 A | 1/1998 | Itoyama et al. |
| 5,707,715 A | 1/1998 | deRochemont et al. |
| 5,713,875 A | 2/1998 | Tanner, II |
| 5,747,350 A | 5/1998 | Sattler |
| 5,747,870 A | 5/1998 | Pedder |
| 5,748,827 A | 5/1998 | Holl et al. |
| 5,759,923 A | 6/1998 | McMillan et al. |
| 5,764,189 A | 6/1998 | Lohninger |
| 5,771,567 A | 6/1998 | Pierce et al. |
| 5,776,103 A | 7/1998 | Kriesel et al. |
| 5,779,676 A | 7/1998 | Kriesel et al. |
| 5,785,688 A | 7/1998 | Joshi et al. |
| 5,797,881 A | 8/1998 | Gadot |
| 5,800,397 A | 9/1998 | Wilson et al. |
| 5,807,075 A | 9/1998 | Jacobsen et al. |
| 5,839,467 A | 11/1998 | Saaski et al. |
| 5,854,608 A | 12/1998 | Leisten |
| 5,858,239 A | 1/1999 | Kenley et al. |
| 5,859,621 A | 1/1999 | Leisten |
| 5,889,459 A | 3/1999 | Hattori et al. |
| 5,891,097 A | 4/1999 | Saito et al. |
| 5,892,489 A | 4/1999 | Kanba et al. |
| 5,897,530 A | 4/1999 | Jackson |
| 5,903,421 A | 5/1999 | Furutani et al. |
| 5,906,597 A | 5/1999 | McPhee |
| 5,911,716 A | 6/1999 | Rake et al. |
| 5,919,167 A | 7/1999 | Mulhauser et al. |
| 5,933,121 A | 8/1999 | Rainhart et al. |
| 5,945,963 A | 8/1999 | Leisten |
| 5,957,890 A | 9/1999 | Mann et al. |
| 5,961,492 A | 10/1999 | Kriesel et al. |
| 5,965,848 A | 10/1999 | Altschul et al. |
| 6,019,747 A | 2/2000 | McPhee |
| 6,023,251 A | 2/2000 | Koo et al. |
| 6,027,826 A | 2/2000 | deRochemont et al. |
| 6,028,568 A | 2/2000 | Asakura et al. |
| 6,031,445 A | 2/2000 | Marty et al. |
| 6,040,805 A | 3/2000 | Huynh et al. |
| 6,046,707 A | 4/2000 | Gaughan et al. |
| 6,052,040 A | 4/2000 | Hino |
| 6,111,544 A | 8/2000 | Dakeya et al. |
| 6,143,432 A | 11/2000 | de Rochemont et al. |
| 6,154,176 A | 11/2000 | Fathy et al. |
| 6,174,300 B1 | 1/2001 | Kriesel et al. |
| 6,176,004 B1 | 1/2001 | Rainhart et al. |
| 6,181,297 B1 | 1/2001 | Leisten |
| 6,188,368 B1 | 2/2001 | Koriyama et al. |
| 6,190,359 B1 | 2/2001 | Heruth |
| 6,195,049 B1 | 2/2001 | Kim et al. |
| 6,200,293 B1 | 3/2001 | Kriesel et al. |
| 6,204,203 B1 | 3/2001 | Narwankar et al. |
| 6,208,843 B1 | 3/2001 | Huang et al. |
| 6,222,489 B1 | 4/2001 | Tsuru et al. |
| 6,266,020 B1 | 7/2001 | Chang |
| 6,300,894 B1 | 10/2001 | Lynch et al. |
| 6,320,547 B1 | 11/2001 | Fathy et al. |
| 6,323,549 B1 | 11/2001 | deRochemont et al. |
| 6,363,609 B1 | 4/2002 | Pickren |
| 6,375,638 B2 | 4/2002 | Nason et al. |
| 6,474,219 B2 | 11/2002 | Klitmose et al. |
| 6,477,065 B2 | 11/2002 | Parks |
| 6,485,461 B1 | 11/2002 | Mason et al. |
| 6,485,462 B1 | 11/2002 | Kriesel |
| 6,492,949 B1 | 12/2002 | Breglia et al. |
| 6,496,149 B1 | 12/2002 | Birnbaum et al. |
| 6,501,415 B1 | 12/2002 | Viana et al. |
| 6,520,936 B1 | 2/2003 | Mann |
| 6,527,744 B1 | 3/2003 | Kriesel et al. |
| 6,537,249 B2 | 3/2003 | Kriesell et al. |
| 6,540,260 B1 | 4/2003 | Tan |

(56) References Cited

U.S. PATENT DOCUMENTS

| | | |
|---|---|---|
| 6,541,820 B1 | 4/2003 | Bol |
| 6,552,693 B1 | 4/2003 | Leisten |
| 6,559,735 B1 | 5/2003 | Hoang et al. |
| 6,569,115 B1 | 5/2003 | Barker et al. |
| 6,583,699 B2 | 6/2003 | Yokoyama |
| 6,595,956 B1 | 7/2003 | Gross et al. |
| 6,605,151 B1 | 8/2003 | Wessels et al. |
| 6,611,419 B1 | 8/2003 | Chakravorty |
| 6,620,750 B2 | 9/2003 | Kim et al. |
| 6,635,958 B2 | 10/2003 | Bates et al. |
| 6,639,556 B2 | 10/2003 | Baba |
| 6,642,908 B2 | 11/2003 | Pleva et al. |
| 6,650,303 B2 | 11/2003 | Kim et al. |
| 6,656,158 B2 | 12/2003 | Mahoney et al. |
| 6,670,497 B2 | 12/2003 | Tashino et al. |
| 6,680,700 B2 | 1/2004 | Hilgers |
| 6,683,576 B2 | 1/2004 | Achim |
| 6,686,406 B2 | 2/2004 | Tomomatsu et al. |
| 6,690,336 B1 | 2/2004 | Leisten et al. |
| 6,697,605 B1 | 2/2004 | Atokawa et al. |
| 6,699,218 B2 | 3/2004 | Flaherty et al. |
| 6,720,926 B2 | 4/2004 | Killen et al. |
| 6,723,072 B2 | 4/2004 | Flaherty et al. |
| 6,727,785 B2 | 4/2004 | Killen et al. |
| 6,731,244 B2 | 5/2004 | Killen et al. |
| 6,731,248 B2 | 5/2004 | Killen et al. |
| 6,733,890 B2 | 5/2004 | Imanaka et al. |
| 6,740,059 B2 | 5/2004 | Flaherty |
| 6,741,148 B2 | 5/2004 | Killen et al. |
| 6,742,249 B2 | 6/2004 | deRochemont et al. |
| 6,743,744 B1 | 6/2004 | Kim et al. |
| 6,750,740 B2 | 6/2004 | Killen et al. |
| 6,750,820 B2 | 6/2004 | Killen et al. |
| 6,753,745 B2 | 6/2004 | Killen et al. |
| 6,753,814 B2 | 6/2004 | Killen et al. |
| 6,762,237 B2 | 7/2004 | Glatkowski et al. |
| 6,787,181 B2 | 9/2004 | Uchiyama et al. |
| 6,791,496 B1 | 9/2004 | Killen et al. |
| 6,826,031 B2 | 11/2004 | Nagai et al. |
| 6,830,623 B2 | 12/2004 | Hayashi et al. |
| 6,853,288 B2 | 2/2005 | Ahn et al. |
| 6,858,892 B2 | 2/2005 | Yamagata |
| 6,864,848 B2 | 3/2005 | Sievenpiper |
| 6,871,396 B2 | 3/2005 | Sugaya et al. |
| 6,878,871 B2 | 4/2005 | Scher et al. |
| 6,883,778 B1 | 4/2005 | Newton et al. |
| 6,905,989 B2 | 6/2005 | Ellis et al. |
| 6,906,674 B2 | 6/2005 | McKinzie, III et al. |
| 6,914,566 B2 | 7/2005 | Beard |
| 6,919,119 B2 | 7/2005 | Kalkan et al. |
| 6,928,298 B2 | 8/2005 | Furutani et al. |
| 6,943,430 B2 | 9/2005 | Kwon |
| 6,943,731 B2 | 9/2005 | Killen et al. |
| 6,963,259 B2 | 11/2005 | Killen et al. |
| 7,002,436 B2 | 2/2006 | Ma et al. |
| 7,047,637 B2 | 5/2006 | deRochemont et al. |
| 7,060,350 B2 | 6/2006 | Takaya et al. |
| 7,116,949 B2 | 10/2006 | Irie et al. |
| 7,137,694 B2 | 11/2006 | Ferran et al. |
| 7,144,384 B2 | 12/2006 | Gorman et al. |
| 7,160,272 B1 | 1/2007 | Eyal et al. |
| 7,230,316 B2 | 6/2007 | Yamazaki et al. |
| 7,291,782 B2 | 11/2007 | Sager et al. |
| 7,303,549 B2 | 12/2007 | Flaherty et al. |
| 7,405,698 B2 | 7/2008 | de Rochemont |
| 7,522,124 B2 | 4/2009 | Smith et al. |
| 7,553,512 B2 | 6/2009 | Kodas et al. |
| 7,564,887 B2 | 7/2009 | Wang et al. |
| 7,595,623 B2 | 9/2009 | Bennett |
| 7,652,901 B2 | 1/2010 | Kirchmeier et al. |
| 7,714,794 B2 | 5/2010 | Tavassoli Hozouri |
| 7,763,917 B2 | 7/2010 | de Rochemont |
| 7,771,391 B2 | 8/2010 | Carter |
| 7,812,774 B2 | 10/2010 | Friman et al. |
| 8,066,805 B2 | 11/2011 | Zurcher et al. |
| 8,069,690 B2 | 12/2011 | DeSantolo et al. |
| 8,114,489 B2 | 2/2012 | Nemat-Nasser et al. |
| 8,178,457 B2 | 5/2012 | de Rochemont |
| 8,193,873 B2 | 6/2012 | Kato et al. |
| 8,267,921 B2 | 9/2012 | Yodfat et al. |
| 8,350,657 B2 | 1/2013 | deRochemont |
| 8,354,294 B2 | 1/2013 | de Rochemont et al. |
| 8,593,819 B2 | 11/2013 | de Rochemont |
| 8,715,839 B2 | 5/2014 | de Rochemont |
| 8,939,935 B2 | 1/2015 | OConnor et al. |
| 9,180,244 B2 | 11/2015 | Anderson et al. |
| 9,192,716 B2 | 11/2015 | Jugl et al. |
| 9,402,950 B2 | 8/2016 | Dilanni et al. |
| 9,520,649 B2 | 12/2016 | de Rochemont |
| 9,656,017 B2 | 5/2017 | Greene |
| 9,857,090 B2 | 1/2018 | Golden et al. |
| 2001/0009398 A1* | 7/2001 | Sekura ............... G04G 13/026 368/10 |
| 2001/0048969 A1 | 12/2001 | Constantino et al. |
| 2001/0056258 A1 | 12/2001 | Evans |
| 2002/0047768 A1 | 4/2002 | Duffy |
| 2002/0070983 A1 | 6/2002 | Kozub et al. |
| 2002/0173769 A1 | 11/2002 | Gray et al. |
| 2002/0190818 A1 | 12/2002 | Endou et al. |
| 2003/0034124 A1 | 2/2003 | Sugaya et al. |
| 2003/0040715 A1 | 2/2003 | DAntonio et al. |
| 2003/0122647 A1 | 7/2003 | Ou |
| 2003/0148024 A1 | 8/2003 | Kodas et al. |
| 2003/0170436 A1 | 9/2003 | Sumi et al. |
| 2003/0221621 A1 | 12/2003 | Pokharna et al. |
| 2004/0064088 A1 | 4/2004 | Gorman et al. |
| 2004/0068224 A1 | 4/2004 | Couvillon, Jr. et al. |
| 2004/0069044 A1 | 4/2004 | Lavi et al. |
| 2005/0020980 A1 | 1/2005 | Inoue et al. |
| 2005/0134609 A1 | 6/2005 | Yu |
| 2005/0182366 A1 | 8/2005 | Vogt et al. |
| 2005/0203461 A1 | 9/2005 | Flaherty et al. |
| 2005/0238507 A1 | 10/2005 | Dilanni et al. |
| 2005/0262451 A1 | 11/2005 | Remignanti et al. |
| 2006/0041229 A1 | 2/2006 | Garibotto et al. |
| 2006/0079765 A1 | 4/2006 | Neer et al. |
| 2006/0086994 A1 | 4/2006 | Viefers et al. |
| 2006/0134491 A1 | 6/2006 | Hilchenko et al. |
| 2006/0178633 A1 | 8/2006 | Garibotto et al. |
| 2007/0100635 A1 | 5/2007 | Mahajan et al. |
| 2007/0118405 A1 | 5/2007 | Campbell et al. |
| 2007/0166453 A1 | 7/2007 | Van Duren et al. |
| 2007/0194890 A1* | 8/2007 | Brue ................... G16H 40/67 340/309.16 |
| 2007/0259768 A1 | 11/2007 | Kear et al. |
| 2008/0051738 A1 | 2/2008 | Griffin |
| 2008/0114304 A1 | 5/2008 | Nalesso et al. |
| 2008/0160492 A1 | 7/2008 | Campbell et al. |
| 2008/0172028 A1 | 7/2008 | Blomquist |
| 2009/0221890 A1* | 9/2009 | Saffer ................. A61B 5/742 600/347 |
| 2009/0326472 A1 | 12/2009 | Carter |
| 2010/0017141 A1 | 1/2010 | Campbell et al. |
| 2010/0036326 A1 | 2/2010 | Matusch |
| 2010/0064243 A1 | 3/2010 | Buck et al. |
| 2010/0077198 A1 | 3/2010 | Buck et al. |
| 2010/0114026 A1 | 5/2010 | Karratt |
| 2010/0185183 A1 | 7/2010 | Alme et al. |
| 2010/0241066 A1 | 9/2010 | Hansen et al. |
| 2011/0009724 A1 | 1/2011 | Hill et al. |
| 2011/0049394 A1 | 3/2011 | de Rochemont |
| 2011/0065224 A1 | 3/2011 | Bollman et al. |
| 2011/0071765 A1 | 3/2011 | Yodfat et al. |
| 2011/0144586 A1 | 6/2011 | Michaud et al. |
| 2012/0124521 A1 | 5/2012 | Guo |
| 2012/0150446 A1 | 6/2012 | Chang et al. |
| 2012/0226259 A1 | 9/2012 | Yodfat et al. |
| 2012/0250449 A1 | 10/2012 | Nakano |
| 2013/0172695 A1 | 7/2013 | Nielsen et al. |
| 2013/0172710 A1 | 7/2013 | Mears et al. |
| 2013/0245545 A1 | 9/2013 | Arnold et al. |
| 2013/0296792 A1 | 11/2013 | Cabiri |
| 2013/0298080 A1 | 11/2013 | Griffin et al. |
| 2013/0332874 A1 | 12/2013 | Rosinko et al. |

(56) References Cited

U.S. PATENT DOCUMENTS

| | | |
|---|---|---|
| 2013/0346858 A1 | 12/2013 | Neyrinck |
| 2014/0018730 A1 | 1/2014 | Muller-Pathle |
| 2014/0032549 A1 | 1/2014 | McDaniel et al. |
| 2014/0088428 A1 | 3/2014 | Yang et al. |
| 2014/0108046 A1 | 4/2014 | Cabrera et al. |
| 2014/0129951 A1 | 5/2014 | Amin et al. |
| 2014/0142508 A1 | 5/2014 | Dilanni et al. |
| 2014/0171901 A1 | 6/2014 | Langsdorf et al. |
| 2015/0025503 A1 | 1/2015 | Searle et al. |
| 2015/0041498 A1 | 2/2015 | Kakiuchi et al. |
| 2015/0134353 A1 | 5/2015 | Ferrell et al. |
| 2015/0193585 A1 | 7/2015 | Sunna |
| 2015/0202386 A1 | 7/2015 | Brady et al. |
| 2015/0205509 A1 | 7/2015 | Scriven et al. |
| 2015/0205511 A1 | 7/2015 | Vinna et al. |
| 2015/0301691 A1 | 10/2015 | Qin |
| 2015/0331995 A1 | 11/2015 | Zhao et al. |
| 2015/0356250 A1 | 12/2015 | Polimeni |
| 2015/0366945 A1 | 12/2015 | Greene et al. |
| 2016/0019352 A1 | 1/2016 | Cohen et al. |
| 2016/0220181 A1 | 8/2016 | Rigooard et al. |
| 2016/0259889 A1 | 9/2016 | Murtha et al. |
| 2017/0021096 A1 | 1/2017 | Cole et al. |
| 2017/0087059 A1* | 3/2017 | Rodriguez ............ A61J 7/0427 |
| 2017/0131887 A1 | 5/2017 | Kim et al. |
| 2017/0216524 A1 | 8/2017 | Haider et al. |
| 2017/0239415 A1 | 8/2017 | Hwang et al. |
| 2017/0273612 A1* | 9/2017 | Kim ...................... A61B 5/486 |
| 2017/0354574 A1* | 12/2017 | Feng ...................... G16H 40/63 |
| 2018/0040255 A1 | 2/2018 | Freeman et al. |
| 2018/0064609 A1* | 3/2018 | Hines ...................... G16H 40/67 |
| 2018/0075200 A1 | 3/2018 | Davis et al. |
| 2018/0169334 A1 | 6/2018 | Grosman et al. |
| 2018/0200434 A1 | 7/2018 | Mazlish et al. |
| 2018/0200441 A1 | 7/2018 | Desborough et al. |
| 2018/0296757 A1 | 10/2018 | Finan et al. |
| 2018/0307515 A1 | 10/2018 | Meller et al. |
| 2018/0321842 A1* | 11/2018 | Lee ...................... H04M 1/725 |
| 2019/0008465 A1* | 1/2019 | Muehlsteff ............ A61B 5/74 |
| 2019/0095052 A1 | 3/2019 | De Wever et al. |
| 2019/0132801 A1 | 5/2019 | Kamath et al. |
| 2019/0133888 A1* | 5/2019 | Lam ...................... A61J 7/049 |
| 2019/0184091 A1 | 6/2019 | Sjolund et al. |
| 2019/0216336 A1* | 7/2019 | Radha ...................... G16H 20/30 |
| 2019/0321545 A1 | 10/2019 | Saint |
| 2019/0374714 A1 | 12/2019 | Rioux et al. |
| 2020/0001006 A1 | 1/2020 | Pizzochero et al. |
| 2020/0051680 A1* | 2/2020 | Yadav ................. G07C 9/00309 |
| 2020/0101225 A1 | 4/2020 | O'Connor et al. |
| 2020/0106873 A1* | 4/2020 | Nagareda ................. G04F 10/00 |
| 2020/0113515 A1 | 4/2020 | O'Connor et al. |
| 2020/0206420 A1* | 7/2020 | Michaud ................. G16H 20/17 |
| 2021/0085861 A1* | 3/2021 | Patel ...................... G16H 40/67 |
| 2021/0361532 A1* | 11/2021 | Hayashi ................. A61J 7/0076 |

FOREIGN PATENT DOCUMENTS

| | | |
|---|---|---|
| EP | 0026056 A1 | 4/1981 |
| EP | 0867196 A2 | 9/1998 |
| EP | 0939451 A1 | 9/1999 |
| EP | 1177802 A1 | 2/2002 |
| EP | 1376759 A2 | 1/2004 |
| EP | 2468338 A1 | 6/2012 |
| EP | 2703024 A1 | 3/2014 |
| EP | 3193979 A1 | 7/2017 |
| EP | 3607985 A1 | 2/2020 |
| FR | 2096275 A5 | 2/1972 |
| GB | 1125897 A | 9/1968 |
| JP | 1999019210 A | 1/1999 |
| JP | 2005326943 A | 11/2005 |
| JP | 2008513142 A | 5/2008 |
| WO | 200048112 A2 | 9/1968 |
| WO | 8606796 A1 | 11/1986 |
| WO | 9855073 A1 | 12/1998 |
| WO | 9910040 A1 | 3/1999 |
| WO | 9910049 A1 | 3/1999 |
| WO | 9962576 A1 | 12/1999 |
| WO | 2001078812 A1 | 10/2001 |
| WO | 0226282 A2 | 4/2002 |
| WO | 2002076535 A1 | 10/2002 |
| WO | 2003097133 A1 | 11/2003 |
| WO | 2007066152 A2 | 6/2007 |
| WO | 2009039203 A2 | 3/2009 |
| WO | 2010022069 A2 | 2/2010 |
| WO | 2010077279 A1 | 7/2010 |
| WO | 2010139793 A1 | 12/2010 |
| WO | 2011031458 A1 | 3/2011 |
| WO | 2011075042 A1 | 6/2011 |
| WO | 2011133823 A1 | 10/2011 |
| WO | 2012073032 A1 | 6/2012 |
| WO | 2013050535 A2 | 4/2013 |
| WO | 2014029416 A1 | 2/2014 |
| WO | 2014149357 A1 | 9/2014 |
| WO | 2014179774 A1 | 11/2014 |
| WO | 2015117082 A1 | 8/2015 |
| WO | 2015117854 A1 | 8/2015 |
| WO | 2015167201 A1 | 11/2015 |
| WO | 2015177082 A1 | 11/2015 |
| WO | 2016041873 A1 | 3/2016 |
| WO | 2017187177 A1 | 11/2017 |
| WO | 2019094440 A1 | 5/2019 |

OTHER PUBLICATIONS

Bardi et al., "Plane Wave Scattering From Frequency-Selective Surfaces by the Finite-Element Method" IEEE Transactions on Magnetics 38(2):641-644 (2002).

Chappell et al., "Composite Metamaterial Systems for Two-Dimensional Periodic Structures" IEEE, 3840387 (2002).

Cheng et al., "Preparation and Characterization of (Ba, Sr) TiO3 thin films using interdigitial electrodes" Microelectronic Engineering, 66:872-879 (2003).

Clavijo et al., "Design Methodology for Sievenpiper High-Impedance Surfaces: An Artificial Magnetic Conductor for Positive Gain Electrically Small Antennas" IEEE Transactions on Antennas and Propagation, 51(10):2678-2690 (2003).

Diaz et al., "Magnetic Loading of Antificial Magnetic Conductors for Bandwidth Enhancement" IEEE, 431-434 (2003).

Hansen "Effect of a High-Impedance Screen on a Dipole Antenna" IEEE Antennas and Wireless Propagation Letter, 1:46-49 (2002).

Joshi et al., "Processing and Characterization of Pure and Doped Ba0.6Sr0.4TiO3 thin films for tunable microsave applications" Mat. Res. Soc. Symp. Proc., 656E:DD4.9.1-DD4.9.6 (2001).

Kern et al., "Active Negative Impedance Loaded EBG Structures for the Realization of Ultra-Wideband Artificial Magnetic Conductors" IEEE, 427-430 (2003).

Kern et al., "The Synthesis of Metamaterial Ferrites for RF Applications Using Electromagnetic Bandgap Structures" IEEE, 497-500 (2003).

Kern et al., "Ultra-thin Electromagnetic Bandgap Absorbers Synthesized via Genetic Algorithms" IEEE, 1119-1122 (2003).

Kuhn et al., "Characterization of novel mono- and bifacially active semi-transparent crystalline silicon solar cells" IEEE Transactions on Electron Devices, 46(10): 2013-2017 (1999).

Kretly et al., "The Influence of the Height Variation on the Frequency Bandgap in an AMC, Artificial magnetic Conductor for Wireless Applications: an EM Experimental Design Approach" Proceedings SBMO/IEEE MTT-S IMOC, 219-223 (2003).

Lee et al., "Investigation of Electromagnetic Bandgap (EBG) Structures for Antenna Pattern Control" IEEE, 1115-1118 (2003).

McKinzie III et al., "Mitigation of Multipath Through the Use of an Artificial Magnetic Conductor for Precision CPS Surveying Antennas" IEEE, 640-643.

Monorciho et al., "Synthesis of Artificial Magnetic Conductors by Using Multilatered Frequency Selective Surfaces" EEE Antennas and Wireless Propagation Letters, 1:196-1999 (2002).

Mosallaei et al. "Periodic Bandgap and Effective Dielectric Materials in Electromagnetics: Characterization and Applications in

(56) References Cited

OTHER PUBLICATIONS

Nanocavities and Waveguides" IEEE Transcations on Antennas and Propagation, 51(3):549-563 (2003).
Pontes et al., "Study of the dielectric and ferroelectric properties of chemically processed BaxSr1—xTiO3 thin films" Thin Solid Films, 386(2)91-98 (2001).
Rogers et al., "AMCs Comprised of Interdigital Capacitor FSS Layers Enable Lower Cost Applications" IEEE, 411-414 (2003).
Sievenpiper et al., "Two-Dimensional Beam Steering Using an Electrically Tunable Impedance Surface" IEEE Transactions on Antennas and Propagation, 51(10):2713-2722(2003).
Sun et al., "Efficiency of Various Photonic Bandgap (PBG) Structures" 3rd Int'l. Conf. on Microwave and Millimeter Wave Technology Proceedings, 1055-1058 (2002).
Tsunemine et al., "Pt/BaxSr(1-x)TiO3/Pt Capacitor Technology for 0.15 micron Embedded Dynamic Random Access Memory" Jap. J. Appl. Phys., 43(5A):2457-2461 (2004).
Vest "Metallo-organic decomposition (MOD) processing of ferroelectric and electro-optic films: A review" Ferroelectrics, 102(1):53-68 (1990).
Viviani et al., "Positive Temperature Coefficient of Electrical Resistivity below 150k of Barium Strontium Titanate" J. Amer. Ceram. Soc. 87(4): 756-758 (2004).
Weily et al., "Antennas Based on 2-D and 3-D Electromagnetic Bandgap Materials" IEEE, 847-850 (2003).
Yang et al., "Surface Waves of Printed Antennas on Planar Artificial Periodic Dielectric Structures" IEEE Transactions on Antennas and Propagation 49(3): 444-450 (2001).
Zhang et al., "Planar Artificial magnetic Conductors and Patch Antennas" IEEE Transactions on Antennas and Propagation, 51(10):2704-2712 (2003).
Ziroff et al., "A Novel Approach for LTCC Packaging Using a PBG Structure for Shielding and Package Mode Suppression" 33rd European Microwave Conference—Munich 419-422 (2003).
International Search Report and Written Opinion for Application No. PCT/US17/61336, mailed on Jan. 25, 2018, 9 pages.
"Graph Chart." iconfinder.com. Aug. 15, 2016. Accessed Apr. 21, 2020. Available online at URL: https://www.iconfinder.com/iconsets/graph-chart-2>.
"Circular Progress Indicator Component for React." reactscript.com. Dec. 2, 2016. Accessed Sep. 9, 2020. Available online at URL: <http://reactscripts.com/circular-progress-indicator-component-react/>.
Kruska, Michal. "Circle progress bar." dribbble.com. Oct. 18, 2012. Accessed Apr. 21, 2020. Available online at URL: <https://dribbble.com/shots/775718-Circle-progress-bar>.
"C# custom control <circle progress bar) Xamarian Forms." stackoverflow.com. May 22, 2016. Accessed Apr. 21, 2020. Available online at URL: <https://stackoverflow.com/questions/37379868/c-sharp-custom-control-circle-progress-bar-kamarin-forms>.
International Search Report and Written Opinion for Application No. PCT/US2021/047685 mailed on Dec. 6, 2021, 15 pages.
International Search Report and Written Opinion for the International Patent Application No. PCT/US2021/055745, mailed Feb. 14, 2022, 13 pages.
"Circular Loader." dribbble.com. Nov. 19, 2015. Accessed Jul. 24, 2019. Available online at URL: https://dribbble.com/shots/2362441-Circular-Loader (Year: 2015).
"Creating NSSlider with 2 knobs (range slider)." stackoverflow.com. May 6, 2015. Accessed Oct. 25, 2018. Available online at URL: <https://stackoverflow.com/questions/30082809/creating-nsslider-with-2- -knobs-range-slider> (Year: 2015).
"How to do a Round Slider." freecodecamp.org. Comment from Aug. 2018. Accessed Jul. 24, 2019. Available online at URL: https://www.freecodecamp.org/forum/t/how-to-do-a-round-slider/220375 (Year: 2018).
"Tick and cross circle shape icon . . . " depositphotos.com. Aug. 27, 2016. Accessed Feb. 1, 2019. Available online at URL:<https://depositphotos.com/121291612/stock-illustration-tick-and-cross-circle-shape.html> (Year: 2016).
"Vector-Vector Illustration of Preloader / Buffer Shapes, or Dials with Knobs." 123rf.com. Date not available. Accessed Oct. 25, 2018. Available online at URL: <https://www.123rf.com/photo_37292689_stock-vector-vector-illustration- -of-preloader-buffer-shapes-or-dials-with-knobs.html> (Year: N/A).
Gad, Tess. "Framer Cheat Sheet: Slider & Range Sliders." blog.framer.com. Jun. 12, 2017. Accessed Oct. 25, 2018. Available online at URL: <https://blog.framer.com/framer-cheat-sheets-slider-range-sliders-3dd2e5a4621d> (Year: 2017).
Obaizamomwan, Osas. "How to use the new features in iOS 9 Notes App." iphonehacks.com. Sep. 12, 2015. Accessed Apr. 24, 2018. Available online at URL: https://www.iphonehacks.com/2015/09/how-to-use-the-new-features-in-ios-9-notes-app.html.
International Search Report and Written Opinion for the International Patent Application No. PCT/US21/064056, mailed Apr. 4, 2022, 12 pages.
International Search Report and Written Opinion for the International Patent Application No. PCT/US21/064170, mailed Apr. 20, 2022, 12 pages.
Anonymous: "AndroidAPS ComponentOverview", AndroidAPS documentation, Nov. 12, 2020 (Nov. 12, 2020), pp. 1-7, Retrieved from the Internet: URL:https://github.com/openaps/AndroidAPSdocs/blob/199ef86a900adf4b3d9c32f605eb11047bd3d62f/docs/EN/Module/module.rst [retrieved on Apr. 11, 2022] the whole document.
Team Section—Qonto, by Christophe Kerebel, dated Dec. 12, 2018, dribbble.com [online]. Retrieved Jul. 1, 2022 from internet <URL: https://dribbble.com/shots/5676730-Team-Section-Qonto> (Year: 2018).

* cited by examiner

SCHEDULING OF MEDICAMENT BOLUS DELIVERIES BY A MEDICAMENT DELIVERY DEVICE AT FUTURE DATES AND TIMES WITH A COMPUTING DEVICE

RELATED APPLICATIONS

This application claims the benefit of U.S. Provisional Patent Application No. 63/127,218, filed Dec. 18, 2020, and U.S. Provisional Patent Application No. 63/228,415, filed Aug. 2, 2021, the contents of which are incorporated herein by reference in their entirety.

BACKGROUND

Traditionally, a diabetic patient delivered insulin boluses manually by injection. The patient had to determine when an insulin bolus was needed to offset glucose levels rising as a result of an ingested meal and then had to determine the dosage of the insulin bolus. Unfortunately, many diabetic patients often did not time their insulin bolus deliveries well, and many diabetic patients also did not determine the dosages for insulin boluses well. As a result, some diabetic patients experienced hyperglycemia or hypoglycemia. It is not uncommon for diabetics to experience less than optimal outcomes due to inaccurate timing and execution of boluses.

Some automated insulin delivery devices have added bolus calculators that help a user to better calculate a dosage for an insulin bolus. Some automated insulin delivery devices even possess knowledge of carbohydrates amounts in common foods. Users may leverage this knowledge to more accurately predict how many carbohydrates are in a meal and in turn, may more accurately calculate an insulin bolus dosage to properly compensate for a rise in glucose resulting from ingesting a meal. Some insulin delivery devices also provide the ability to immediately deliver an insulin bolus to a patient.

SUMMARY

In accordance with an inventive aspect, a method is performed by a processor of a computing device having a display. The method includes displaying a user interface on the display. The user interface is for soliciting information from a user regarding a desired time for scheduling a medicament bolus delivery from a medicament delivery device. Per the method, based on information received via the user interface, the medicament bolus delivery to the user from the medicament delivery device is scheduled by the processor for a future time. The processor causes the medicament delivery device to deliver the medicament bolus delivery at the scheduled future time.

The user interface may solicit a desired time and a desired date for scheduling the medicament bolus delivery from the user. The user interface may solicit a dosage amount for the medicament bolus delivery from the user. The medicament may be insulin, glucagon, a glucagon-like peptide-1 (GLP-1) agonist, pramlintide, or a co-formulation of two or more of the foregoing. The medicament may be one of an analgesic, an antibiotic, an anti-viral agent, an anti-depressant agent, an anti-addiction agent, an anti-anxiety agent, a pain-relieving agent, an antipsychotic agent, an anti-seizure agent, a blood thinning agent, a chemotherapy agent, a hormonal agent, an infertility agent, a statin, a blood pressure controlling agent, an antacid, a birth control agent, a fertility agent, an anti-inflammatory agent, a cardiovascular agent, a muscle relaxant, a sleep disorder agent or a sexual disorder agent. The computing device may be one of a smartphone, a smartwatch, a vehicular infotainment system, or a portion of the medicament delivery device. The method may include displaying a reminder of the scheduled medicament bolus delivery on the display before the delivery occurs. The method may include receiving a confirmation from the user to deliver the scheduled medicament bolus delivery. The causing of the medicament delivery device to deliver the medicament bolus delivery at the scheduled future time may comprise sending a command or a message to the medicament delivery device to deliver the medicament bolus delivery. The causing of the medicament delivery device to deliver the medicament bolus delivery at the scheduled time may comprise automatically delivery the medicament bolus at the scheduled date and time without user interference or confirmation.

In accordance with another inventive aspect, a method may be performed by a processor of a computing device having a display. Per the method, delivery of a medicament bolus by a medicament delivery device to a user is scheduled by a processor for a future time. The processor causes a user interface element to be displayed on the display. The user interface element is activatable to delay the scheduled delivery of the medicament bolus. Based on input received via the user interface element, the processor causes the delivery of the medicament bolus to be delayed to a delayed time that is after the scheduled time.

The method may include displaying an additional user interface on the display to facilitate the user selecting a magnitude of how much the delivery of the medicament bolus is to be delayed relative to the scheduled time. The additional user interface may include elements for selection, where each element is associated with a different magnitude of delay for the delivery of the medicament bolus. The processor may cause the delivery of the medicament bolus to the user by the medicament delivery device at the delayed time. The causing of the delivery of the medicament bolus to the user by the medicament delivery device at the delayed time may comprise sending a command or message from the computing device to the medicament delivery device. The command or message may be sent wirelessly.

In accordance with an additional inventive aspect, a method is performed by a processor of a computing device having a display. The processor schedules delivery of a medicament bolus by a medicament delivery device to a user for a future time. The processor causes a user interface to be displayed on the display. The user interface includes at least one element that is activatable to modify the scheduled delivery of the medicament bolus. Based on input received via the at least one element of the user interface, the processor modifies the scheduled delivery of the medicament bolus by the medicament delivery device.

The modifying may comprise modifying a date and/or a time at which the medicament delivery device is scheduled to deliver the medicament bolus. The modifying may comprise modifying a dosage amount of the scheduled delivery of the medicament bolus. The modifying may comprise canceling the scheduled delivery of the medicament bolus. The method may further include displaying on the display a reminder of the scheduled delivery of a medicament bolus by the medicament delivery device to the user for the future time, wherein the user interface is incorporated into the reminder. The method may include displaying on the display a confirmation of the modifying of the scheduled delivery of the medicament bolus before implementing the modifying.

DETAILED DESCRIPTION

One problem encountered with conventional automated insulin delivery devices is that they may only deliver insulin boluses immediately. This can be problematic as sometimes a user may not be able to cause such conventional insulin delivery devices to deliver an insulin bolus when needed. For example, a user may be driving, may be at a restaurant, may be in a meeting or may be otherwise in a situation where the user cannot or does not wish to interact with the insulin delivery device to deliver an insulin bolus.

Another problem is that a user may forget to deliver an insulin bolus before a meal. This may result in glucose levels rising rapidly and reach too high of a level, causing hyperglycemia.

Exemplary embodiments may solve these problems by enabling a user to schedule medicament bolus deliveries, such as insulin boluses, for future dates and times. Thus, a user may schedule an insulin bolus delivery when the user is driving, at a restaurant or in a meeting, for example. Moreover, a user may schedule a medicament bolus delivery beforehand. For instance, suppose that a user eats a similar meal every day at 7:00 AM. The user may schedule an insulin bolus delivery for every day at 6:45 AM.

The exemplary embodiments may provide the ability to delay a scheduled medicament bolus delivery by short periods of time. For example, suppose that a user is going to eat at 6:15 pm rather than at 6:00 pm. In that case, it may be desired to delay a scheduled insulin bolus delivery by 15 minutes from 5:45 pm to 6:00 pm. The user may reschedule a scheduled medicament bolus delivery by entering a new date and/or time for the medicament bolus delivery. Still further, a user may cancel a scheduled medicament bolus delivery. In addition, in exemplary embodiments, multiple medicament bolus deliveries may be viewed and managed.

Figure 1:
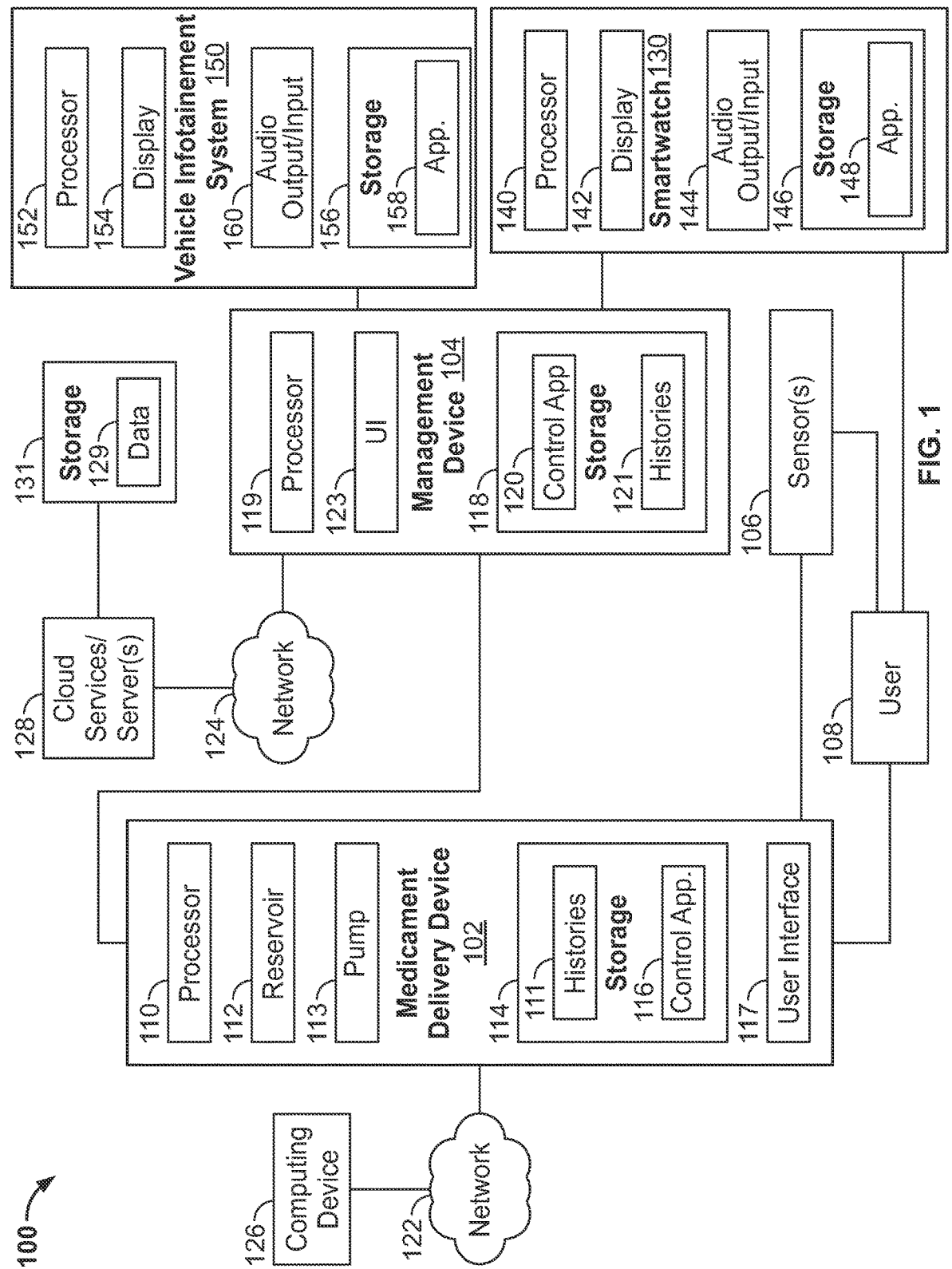
FIG. 1 depicts a computing environment suitable for practicing exemplary embodiments.

FIG. 1 depicts an illustrative medicament delivery system 100 that is suitable for delivering a medicament, such as insulin, a GLP-1 agonist or other medicaments identified above. The medicament delivery system 100 includes a medicament delivery device 102. The medicament delivery device 102 may be a wearable device that is worn on the body of the user 108. The medicament delivery device 102 may be directly coupled to a user (e.g., directly attached to a body part and/or skin of the user 108 via an adhesive or the like) or connected to the user via tubing and an infusion set. In an example, a surface of the medicament delivery device 102 may include an adhesive to facilitate attachment to the user 108.

The medicament delivery device 102 may include a processor 110. The processor 110 may, for example, be a microprocessor, a logic circuit, a field programmable gate array (FPGA), an application specific integrated circuit (ASIC) or a microcontroller coupled to a memory. The processor 110 may maintain a date and time as well as other functions (e.g., calculations or the like). The processor 110 may be operable to execute a control application 116 stored in the storage 114 that enables the processor 110 to implement a control system for controlling operation of the medicament delivery device 102. The control application 116 may control medicament delivery to the user 108 as described herein. The storage 114 may hold histories 111 for a user, such as a history of automated basal medicament deliveries, a history of bolus medicament deliveries, meal event history, activity event history, sensor data, such as glucose level data obtained from a CGM, and the like. In addition, the processor 110 may be operable to receive data or information. The storage 114 may include both primary memory and secondary memory. The storage 114 may include random access memory (RAM), read only memory (ROM), optical storage, magnetic storage, removable storage media, solid state storage, or the like.

The medicament delivery device 102 may include a reservoir 112 for storing medicament for delivery to the user 108 as warranted. A fluid path to the user 108 may be provided, and the medicament delivery device 102 may expel the medicament from the reservoir 112 to deliver the medicament to the user 108 via the fluid path. The fluid path may, for example, include tubing coupling the medicament delivery device 102 to the user 108 (e.g., tubing coupling a cannula to the reservoir 112).

There may be one or more communications links with one or more devices physically separated from the medicament delivery device 102, including, for example, a handheld management device 104 of the user 108 and/or a caregiver of the user 108, and/or sensor(s) 106. The management device 104 may be a smartphone programmed to perform operations as described herein or a dedicated handheld controller device. The communication links may include any wired or wireless communication link operating according to any known communications protocol or standard, such as Bluetooth®, Wi-Fi, a near-field communication standard, a cellular standard, or any other wireless protocol. The medicament delivery device 102 may also include a user interface 117, such as an integrated display device for displaying information to the user 108 and in some embodiments, receiving information from the user 108. The user interface 117 may include a touchscreen and/or one or more input devices, such as buttons, a knob or a keyboard.

The medicament delivery device 102 may interface with a network 122. The network 122 may include a local area network (LAN), a wide area network (WAN) or a combination therein. A computing device 126 may be interfaced with the network, and the computing device 126 may communicate with the medicament delivery device 102.

The medicament delivery system 100 may include sensor (s) 106 for sensing the levels of one or more analytes. The sensor(s) 106 may be coupled to the user 108 by, for example, adhesive or the like and may provide information or data on one or more medical conditions and/or physical attributes of the user 108. The sensor(s) 106 may, in some exemplary embodiments provide periodic glucose concentration measurements and may be a continuous glucose monitor (CGM), or another type of device or sensor that provides glucose measurements, such as glucose concentrations in interstitial fluid that accurately estimates blood glucose levels. The sensor(s) 106 may be physically separate from the medicament delivery device 102 or may be an integrated component thereof. The sensor(s) 106 may provide the processor 110 with data indicative of one or more measured or detected analyte levels of the user 108. The information or data provided by the sensor(s) 106 may be used to adjust medicament delivery operations of the medicament delivery device 102.

The medicament delivery system 100 may also include the handheld management device 104. In some embodiments, no handheld management device 104 is needed; rather the medicament delivery device 102 may manage itself. The handheld management device 104 may be a special purpose device, such as a dedicated personal diabetes manager (PDM) device. The handheld controller device 104 may be a programmed general-purpose device, such as any portable electronic device including, for example, a device with a dedicated controller, such as a processor, a microcontroller or the like. The handheld management device 104 may be used to program or adjust operation of the medicament delivery device 102 and/or the sensor 106. The handheld management device 104 may also be used to view data and other information relating to medicament delivery and analyte levels. The handheld management device 104 may be any portable electronic device including, for example, a dedicated device, a smartphone, a smartwatch or a tablet. In the depicted example, the handheld management device 104 may include a processor 119 and a storage 118. The processor 119 may execute processes to manage and control the delivery of the medicament to the user 108. The processor 119 may also be operable to execute programming code stored in the storage 118. For example, the storage 118 may be operable to store a control application 120 for execution by the processor 119. The control application 120 may be responsible for controlling the medicament delivery device 102, e.g., the automatic insulin delivery (AID) of insulin to the user 108. The storage 118 may store the control application 120, histories 121 like those described above for the medicament delivery device 102 and other data and/or programs.

The handheld management device 104 may include a user interface (UI) 123 for communicating with the user 108. The user interface 123 may include a display, such as a touchscreen, for displaying information. The touchscreen may also be used to receive input when it is a touch screen. The user interface 123 may also include input elements, such as a keyboard, button, knobs, or the like.

The handheld management device 104 may interface with a network 124, such as a LAN or WAN or combination of such networks. The handheld management device 104 may communicate over network 124 with one or more servers or cloud services 128.

The medicament delivery system 100 may include a smartwatch 130 worn by the user 108. The smartwatch 130 includes a processor 140, such as a microprocessor, for executing computer programming instructions such as an application 148 for performing the functionality described herein. The smartwatch 130 also includes a display 142 for displaying content. The display 142 may be a touchscreen for receiving input as well. The smartwatch 130 may include audio output/input 144, such as a speaker and a microphone. The smartwatch 130 may include storage, such as described above for the handheld controller device 104, for holding data and software, such as the application 148.

The smartwatch 130 may have a wireless communication connection with the handheld controller device 104. The smartwatch 130 may issue commands to the medicament delivery device 102 and obtain information from the medicament delivery device 102 by way of wireless communications sent to the handheld management device 104 over the connection. In some embodiments, the smartwatch 130 may have a direct communication link with the medicament delivery device 102 to obtain information and issue commands as shown in FIG. 1. In other embodiments, the smartwatch 130 may forward an instruction to the handheld controller device 104, which then issues the command to the medicament delivery device 102. Similarly, the smartwatch 130 may request information. This request may be received by the handheld management device 104 and then forwarded to the medicament delivery device 102. The medicament delivery device 102 provides the requested information to the handheld management device 104, which returns the requested information to the smartwatch 130. The functional capabilities of the smartwatch 130 in relation to the medicament delivery system 100 will be described in more detail below. The application 148 facilitates communications with the handheld controller device 104 and provides the functionality of the smartwatch 130, which is described in more detail below.

A vehicle infotainment system 150 may be part of the medicament delivery system 100. The vehicle infotainment system 150 may be like those found in many vehicles to enable a user to listen to the radio, play music or other audio content from a portable device like a smartphone, thumb drive or the like. The vehicle infotainment system 150 may provide navigation assistance via displayed maps and audio output. The vehicle infotainment system may include a processor, like a microprocessor, a microcontroller or an ASIC, for executing computer programming instructions, such as application 158. The vehicle infotainment system 150 includes a display 154, such as a touch screen display, and audio output/input 160, such as loudspeakers and a microphone. The vehicle infotainment system 150 includes storage 156, which may comprise memory devices like those discussed above relative to storage 114. The storage 156 may store the application 158. The application 158 facilitates functionality described herein. In some embodiments, the handheld management device 104 includes an application and the vehicle infotainment system 150 may communicate with the handheld management device 104 to realize the functionality described herein.

The vehicle infotainment system 150 may issue commands to the medicament delivery device 102 and obtain information from the medicament delivery device 102 by way of wireless communications sent to the handheld controller device 104 over the connection. Technologies, such as Apple CarPlay or Android Auto, may be used to integrate the handheld management device 104 and the vehicle infotainment system 150. The vehicle infotainment system 150 may forward an instruction to the handheld management device 104, which then issues the command to the medicament delivery device 102. Similarly, the vehicle infotainment system 150 may request information. This request is received by the handheld management device 104 and forwarded to the medicament delivery device 102. The medicament delivery device 102 provides the requested information to the handheld management device 104, which returns the requested information to the vehicle infotainment system 150. The functional capabilities of the vehicle infotainment system 150 in relation to the medicament delivery system 100 will be described in more detail below. The application 158 facilitates communications with the handheld management device 104 and provides the functionality of the vehicle infotainment system 150, which is described in more detail below. In some alternative embodiments, the vehicle infotainment system 150 may have a direct wireless connection with the medicament delivery device 102 as shown in FIG. 1 by the connecting lines.

As was mentioned above, the medicament delivery system 100 may include a smartwatch 130, such as the Apple® Watch, the Fitbit® Versa smartwatch, the Samsung® Galaxy watch, etc. The smartwatch 130 may execute the application 148 on the processor 142 to provide the functionality described herein.

The discussion below will include a number of illustrative user interfaces on different devices and discussion of functionality that may be provided by exemplary embodiments in scheduling medicament bolus deliveries. These user interfaces are intended to be merely illustrative. Other user interfaces may be used. Such user interfaces and functionality described below may be realized as part of execution of the control applications 116, 120, 148 and 156.

Figure 2:
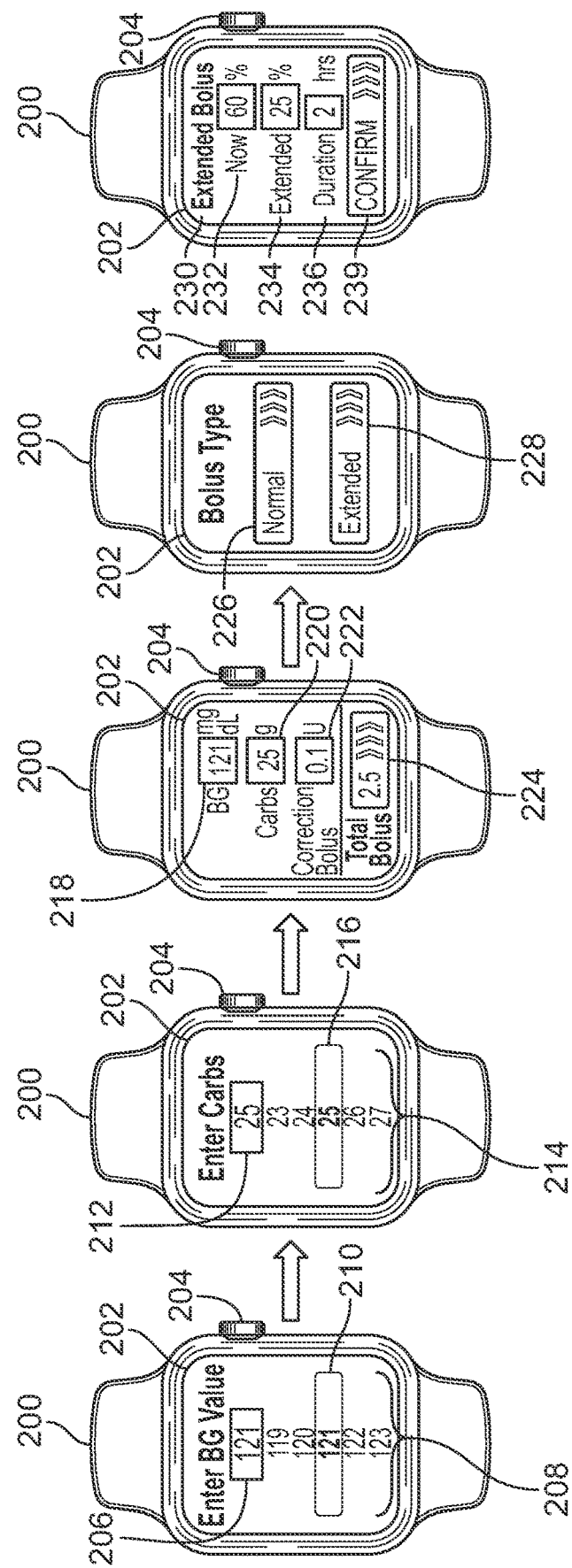
FIG. 2 depicts illustrative display screens of exemplary embodiments on a smartwatch for configuring an extended medicament bolus delivery.

The smartwatch 130 provides the ability to calculate an insulin bolus size and to deliver the insulin bolus of the specified size to the user 108. The user 108 may initiate the process of calculating a bolus and delivering an insulin bolus by selecting the option to deliver an insulin bolus. FIG. 2 shows a sequence of screens that may be displayed on the display 202 of the smartwatch 200 to facilitate calculation of an insulin bolus and delivery of the insulin bolus to the user 108. The user 108 may be prompted initially to enter a glucose value. The user 108 may enter a value in text box 206 or may scroll through displayed value options 208 to select among displayed value options 208, such as value 210, using the rotating knob 204. The glucose value may also be automatically populated by a continuous glucose monitor (CGM) or other sensor 106 that is paired with the insulin controller system. This value may be automatically populated when the UI on display 202 is presented to the user; or the value may be automatically populated when the user taps box 206, which may serve to cause smartwatch 130 to send a request to a CGM or other sensor 106 for the current glucose value. The entered glucose value may be a glucose concentration value expressed in terms of mg/dL or mmol/L. The user 108 is then prompted to enter the amount of carbohydrates as shown in FIG. 2. The user 108 may manually enter the grams of carbohydrates in text box 212 or may scroll through options 208 to select a value such as the highlighted value 214. In the next screen in FIG. 2, the display 202 of the smartwatch 200 shows the entered or retrieved glucose concentration value 218 representing the most recent value for the user 108 and the amount of carbohydrates to be ingested in a meal 220 that was entered by the user 108. A correction factor 222 is also displayed. The correction factor 222 is the number/formula used to correct a user's high or low blood sugar that is out of range. This is managed in his or her settings in the control software. The correction factor 222 indicates how much insulin is required to correct for a gram of carbohydrates ingested, which may be translated into how much insulin is required to bring the user's current blood glucose value to within a desired range or to a desired target blood glucose value. The correction bolus may be populated if a user's blood glucose level is out of range and needs to be factored into an execution of a bolus. This may be a correction for a high blood glucose value by adding to the total bolus amount or a reverse correction for a low blood glucose value that would subtract from the overall bolus value. The application 148 then calculates using the provided information and correction factor and displays the appropriate correction bolus dosage to compensate for the indicated number of carbohydrates given the current glucose concentration (see 224). In the example case, it will take 2.5 units of insulin to compensate for 25 grams of carbohydrates (i.e., 25 grams×0.1 units/gram). The user 108 may be prompted to confirm the formulation of the bolus by physical action, such as swiping right, tapping, or verbal action, such as verbally confirming the bolus. In the next screen shown in FIG. 2, the user 108 is prompted to select either option by selecting a normal bolus by selecting element 226 for a normal bolus, or an extended bolus by selecting element 228. In this example, the user 108 selects by swiping the element 226 or 228 to the right. Tapping or verbal action may also be used. In the example of FIG. 2, the user 108 has selected the extended bolus as indicated by text at 230 on display 202. The user 108 enters percentage values to specify how the extended bolus is to be distributed over time. In text box 232, the user 108 enters the percentage of the bolus to be delivered now (e.g., 60%). In text box 234 the user 108 enters the percentage of the bolus to be delivered in an extended fashion (e.g., 25%). In text box 236, the user 108 enters the duration over which the extended portion is to be delivered (e.g., 2 hours). Default values may be populated in text boxes 232, 234 and 236, and the user may have the option to change or confirm these default values. The smartwatch 130 may also prompt the user to review the insulin amount to be distributed rather than using percentages for extended boluses. Once the user 108 has entered the appropriate values, the user 108 may confirm the extended bolus delivery by selecting element 238, such as by swiping to the right. Tapping or verbal action may also be used.

Figure 3:
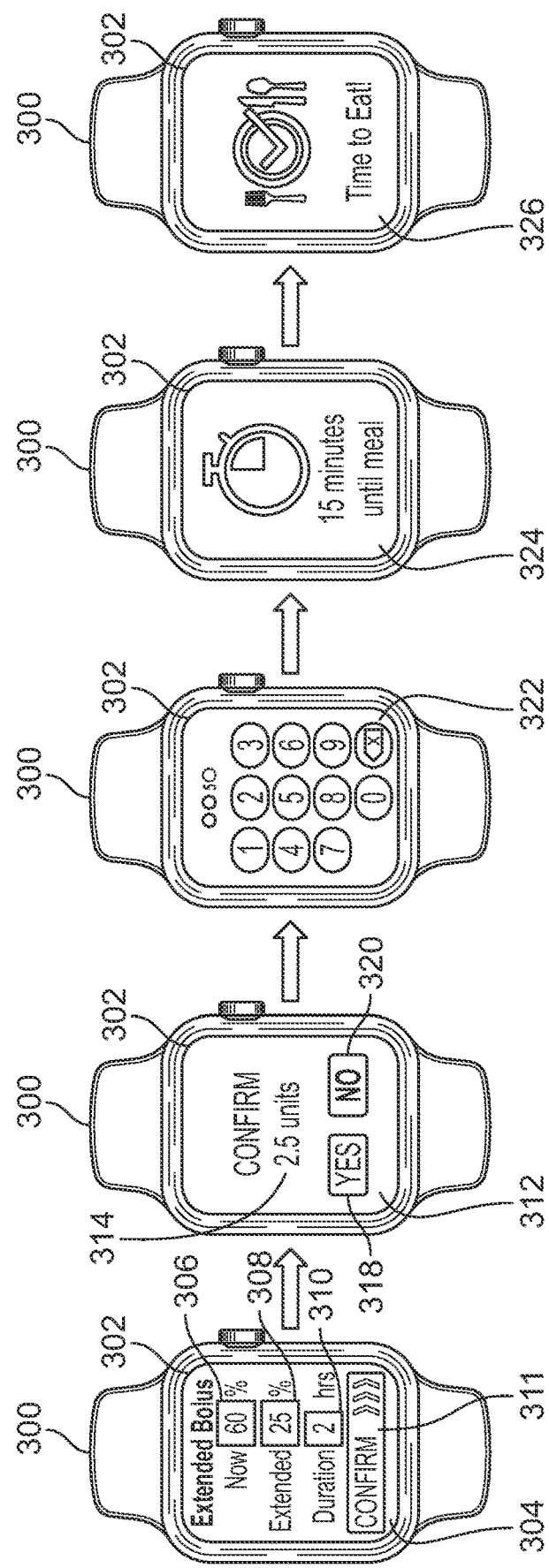
FIG. 3 depicts illustrative display screens of exemplary embodiments on a smartwatch for confirming an extended medicament bolus delivery and providing reminders to a user.

FIG. 3 shows a next sequence of screens after the user 108 has selected to have an extended bolus delivered. Screen 304 shows the percentage of the bolus to be delivered now 306, the percentage of the bolus to be delivered in extended fashion 308 and the duration of the extended delivery 310. The user 108 has initially selected an extended bolus as shown in screen 304 on display 302 of smartwatch 300. Once the user selects the confirm button 311, the user 108 is prompted to confirm delivery of the number of units 314 as shown by screen 312 by selecting the "Yes" button 318 or rejecting the number of units 314 by selecting the "no" button. If the user accepts the delivery of the 2.5 units, the user may enter a confirmatory code via screen 322 to initiate the delivery. The confirmatory code may be established with the user during user on-boarding. The confirmatory code may be the same code that the user uses to unlock smartwatch 300 or another device. Alternatively, a biometric identification may be used. For example, a camera on smartwatch 300 may identify the user's face or eyes and thereby confirm that the user is indeed the one entering the command to confirm delivery of a particular amount of insulin. The smartwatch 300 then displays the screen 324 on display 302 to remind the user 108 that the user 108 will be notified when it is ok to eat, or when the user should eat, or is scheduled to eat, for optimal bolus delivery and pre-prandial and post-prandial blood glucose control. This time parameter may be set by the user 108 in the insulin controller system application, whether that is a controller or smartphone application, or may be a default value that the user can change. The goal of the mealtime reminder is to improve user's glycemic variability by giving insulin before a meal to stay in target glycemic range. In the example shown, the user 108 is reminded to eat in 15 minutes. Smartwatch 300 may vibrate a certain number of times depending on how much time has elapsed. For example, upon setting the reminder, the smartwatch may vibrate once. After 5 minutes have elapsed, such that there are 10 minutes remaining in this example, the smartwatch may vibrate twice. After 10 minutes have elapsed, such that there are 5 minutes remaining in this example, the smartwatch may vibrate three times. After 15 minutes have elapsed, such that there are 0 minutes remaining in this example, the smartwatch may vibrate four times. Other timing and numbers of vibrations may be used. After the 15 minutes has elapsed, the smartwatch 300 displays a screen 326 on display 302 reminding the user 108 that it is time for the user 108 to eat. This helps the user 108 to avoid a problem by having the insulin bolus delivered without ingesting the carbohydrates for which the pre-prandial insulin bolus is intended, in addition to knowing adequate time has passed for the user 108 to ingest the carbohydrates.

Figure 4:
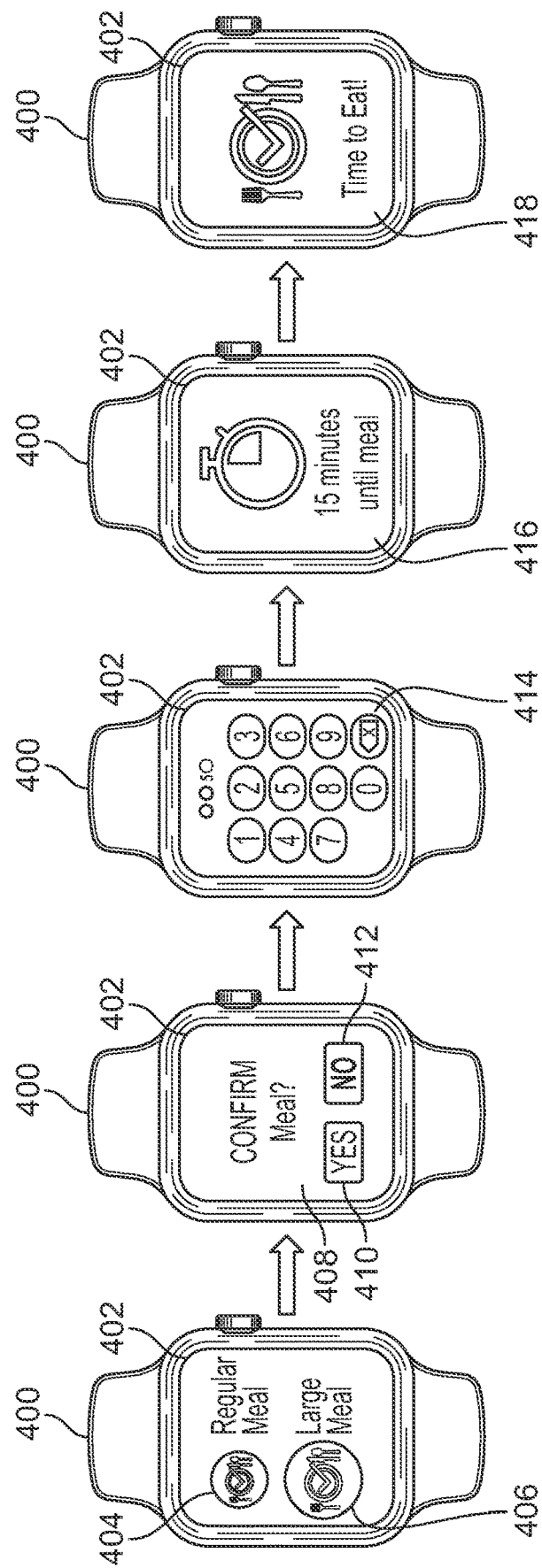
FIG. 4 depicts illustrative display screens of exemplary embodiments on a smartwatch for confirming meal size for a medicament bolus delivery.

The smartwatch 130 may also enable the user to simply choose the size of meal that is to be ingested to determine the insulin bolus dosage rather than specifying the amount of carbohydrates to be ingested in grams. The application 148 may have categories of meal sizes, such as a regular meal and a large meal. A regular meal is presumed to include a first amount of carbohydrates, whereas a large meal is presumed to include a second amount of carbohydrates that is larger than the first amount. A "small meal" or "snack" may also be presented as an option, which may correspond to a lower amount of carbohydrates than the regular meal option. These carbohydrate amounts may be default amounts in the system, or may be defined by either the user 108 or health care provider by programming such amounts into the insulin controller system. Custom meal names (and carbohydrate amounts) may also be set up by the user in the insulin controller system. As shown in FIG. 4, the smartwatch 400 may show on display 402 a regular meal option 404 and a large meal option 406 for selection by the user 108. The user 108 may then be prompted to confirm which of the meal sizes the user 108 selected in screen 408. The screen 408 may include a "Yes" button 410 to confirm the selected meal size or a "No" button 412 to not confirm the selected meal size. Screen 408 may also display an insulin amount that corresponds to the selected meal type. Screen 408 may also enable the user to modify the insulin amount that corresponds to the selected meal type. If the user 108 confirms the meal size by selecting the "Yes" button 410, the user 108 is prompted to enter a confirmatory code to initiate the delivery of the insulin bolus using screen 414. The confirmatory code may be the same code that the user uses to unlock smartwatch 400 or another device. Alternatively, a biometric identification may be used. For example, a camera on smartwatch 400 may identify the user's face or eyes and thereby confirm that the user is indeed the one entering the command to confirm delivery of insulin for a meal type. The user 108 may also be prompted by a voice command on the smartwatch 400 to confirm the meal, by which the user 108 may confirm verbally. As was described previously above, screen 416 provides a reminder of when the user 108 should eat and smartwatch 400 may vibrate a certain number of times to alert the user as to the reminder or how much time is remaining. This screen 416 is followed by a follow up reminder screen 418 when the time to eat arrives. Screen 418 reminds the user 108 that it is time for the user 108 to eat.

Figure 5:
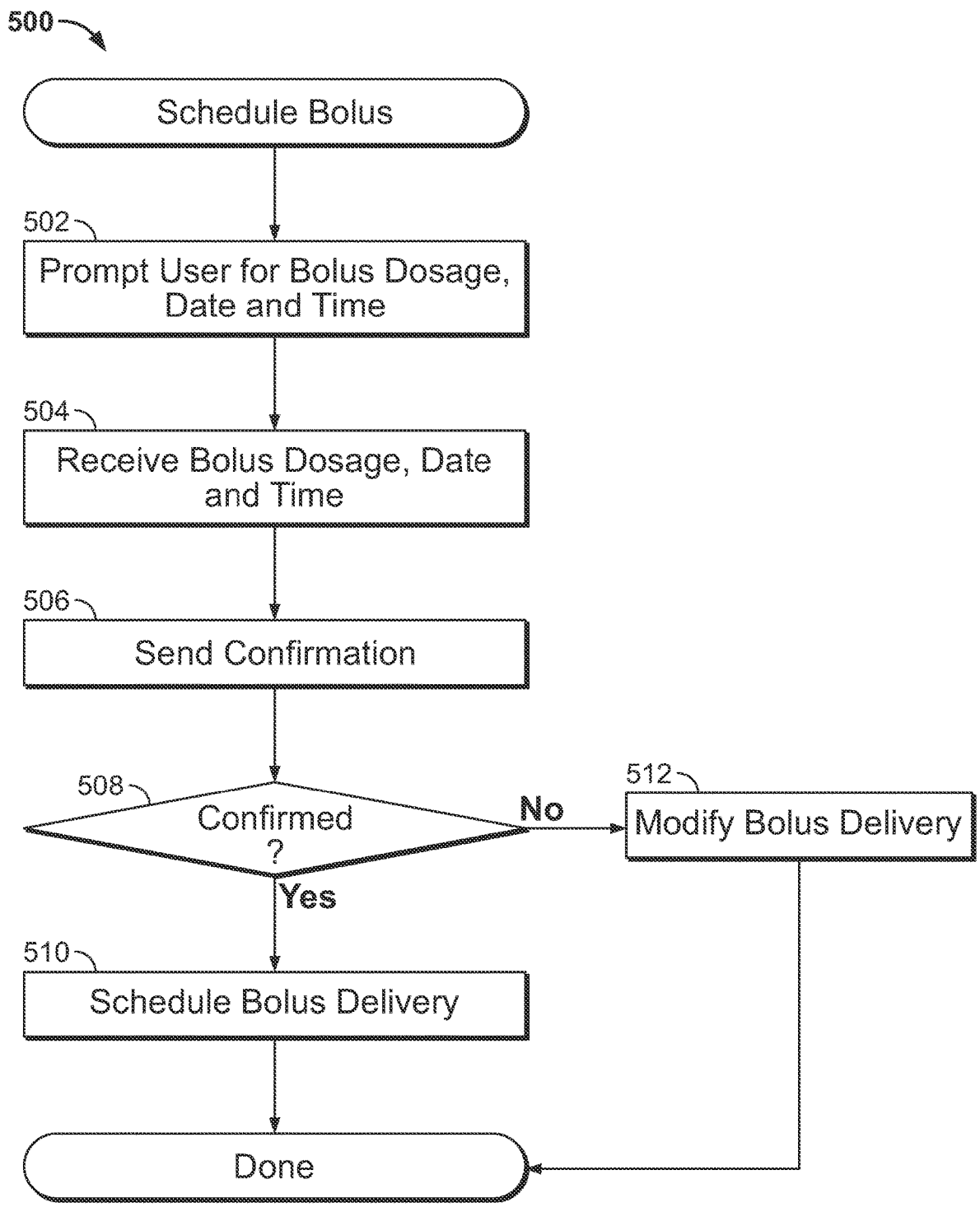
FIG. 5 depicts a flowchart of illustrative steps that may be performed in exemplary embodiments to schedule a medicament bolus delivery.

The bolus or a portion of the bolus of medicament need not be delivered immediately; rather the exemplary embodiments provide the ability to schedule medicament bolus deliveries in the future. FIG. 5 depicts a flowchart of illustrative steps that may be performed in exemplary embodiments to schedule a future medicament bolus delivery via a computing device, such as management device 104, smartwatch 130, vehicle infotainment system 150 or via computing resources, like processor 110 on the medicament delivery device 102. At 502, the user 108 is prompted to specify the bolus dosage, date and time for the medicament bolus delivery that is to be scheduled. The prompt may be provided by user interface elements that are part of a user interface displayed on a display device. At 504, the bolus dosage, date and time for the medicament bolus delivery to be scheduled are received responsive to the prompt. At 506, a confirmation may be sent to the user 108, such as via a user interface. The confirmation seeks to confirm the particulars (e.g., the dosage, the date and the time) received from the user 108. At 508, a determination is made whether the confirmation is confirmed by the user 108 or not. If confirmed, at 510, the bolus delivery is scheduled. The scheduling may entail the control application 116, 120, 148 or 158, recording the particulars of the scheduled medicament bolus delivery and being prepared to send a message or command to the medicament delivery device 102 to cause the medicament bolus to be delivered to the user 108. If the medicament bolus delivery particulars are not confirmed, at 512, the medicament bolus may be modified, such as by editing the particulars or canceling the delivery, as will be discussed below.

Figure 6:
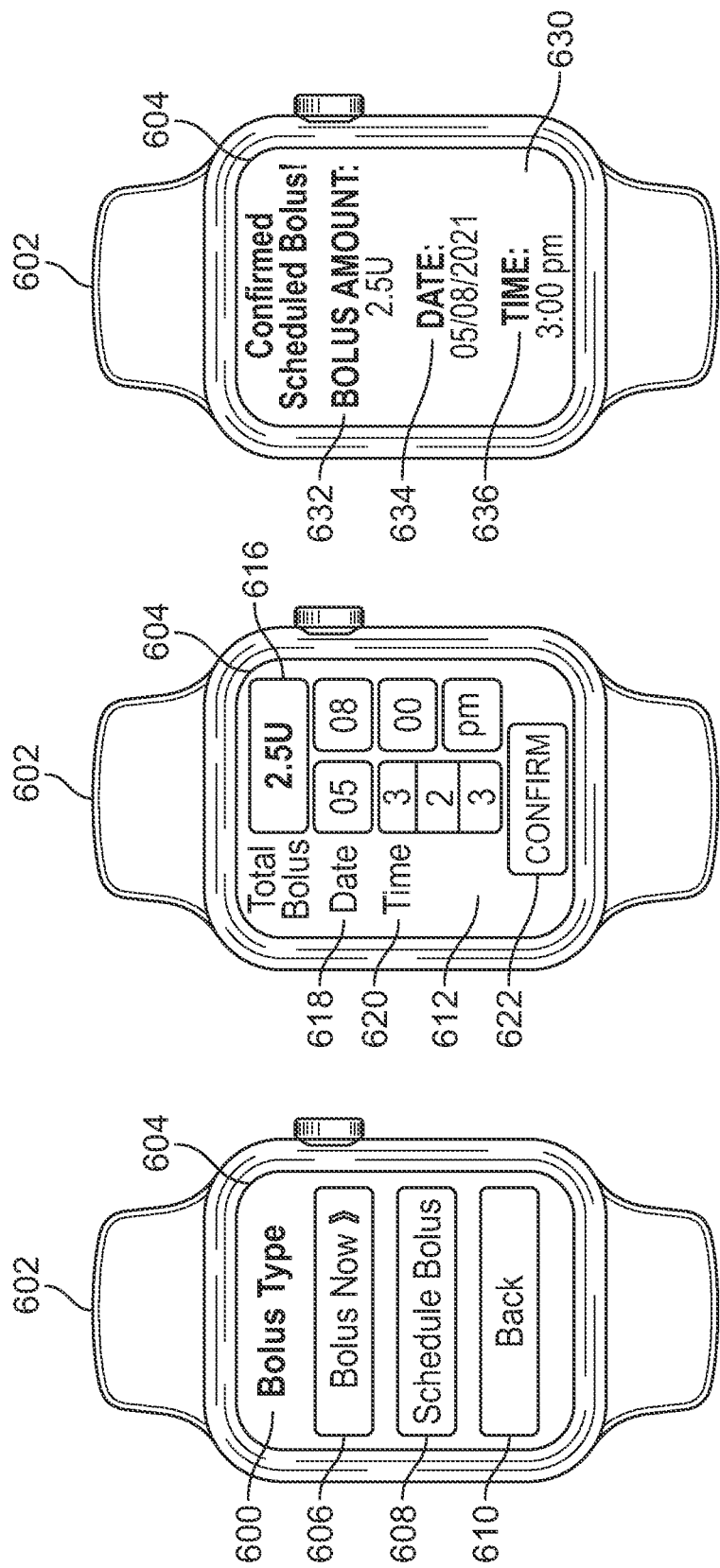
FIG. 6 depicts illustrative display screens of exemplary embodiments on the smartwatch for scheduling a medicament bolus delivery.

The scheduling of the medicament bolus delivery may be performed on smartwatch 130 as shown by the smartwatch screens included in FIG. 6. FIG. 6 depicts a screen 600 on a display 604 of the smartwatch 600 that provides the user 108 with options regarding bolus delivery. A bolus now button 606 may be selected, such as by touching the touchscreen display 604 of the smartwatch 602, to deliver the bolus immediately, such as described above. A schedule bolus button 608 may be selected by the user 108 to schedule a future date and time for the delivery of the medicament bolus. A back button 610 may be selected to navigate back to the previous screen. If the user 108 selects the schedule bolus button 608, screen 612 is displayed. The screen 612 contains user interface elements that facilitate scheduling of the bolus delivery. User interface element 616 enables the user 108 to enter or edit the bolus amount to be delivered. User interface elements 618 may be used by the user to specify the month and day for the date of the scheduled bolus delivery. User interface elements 620 enable the user 108 to specify the time of the bolus delivery in hours and minutes. The confirm button 622 may be selected by the user 108 to confirm the bolus amount and the date and time of the scheduled delivery. The user may go back to the previous screen by swiping (e.g., to the right), or a cancel button (not shown) may be displayed. Upon the confirm button 622 being selected, a confirmation screen 630 may be displayed. The confirmation screen 630 shows the bolus amount 632, date 634 and time 636 for the scheduled bolus delivery.

Figure 7:
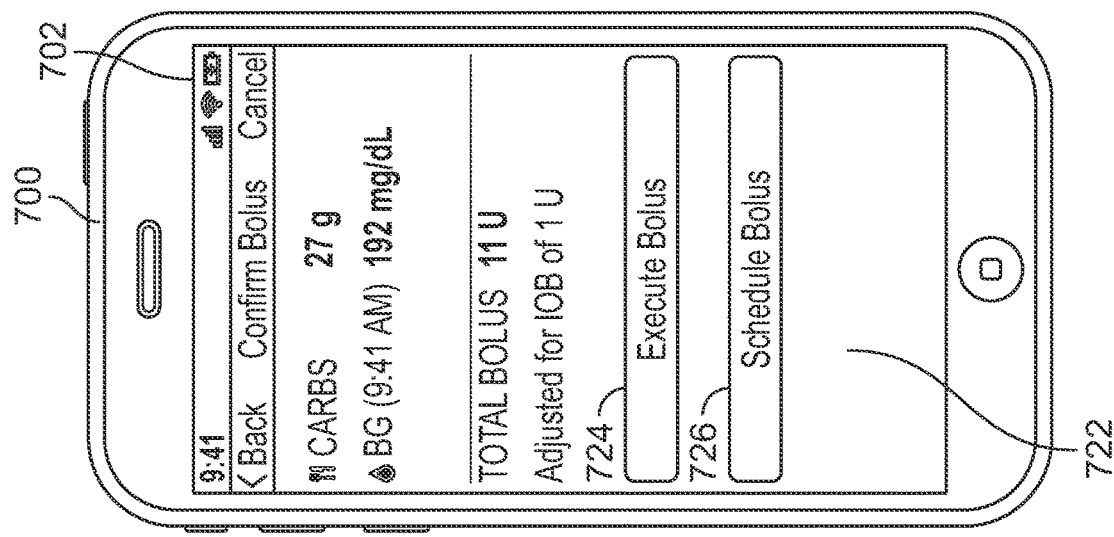
FIG. 7 depicts illustrative display screens of exemplary embodiments on the smartphone management device for scheduling a medicament bolus delivery.
Figure 7:
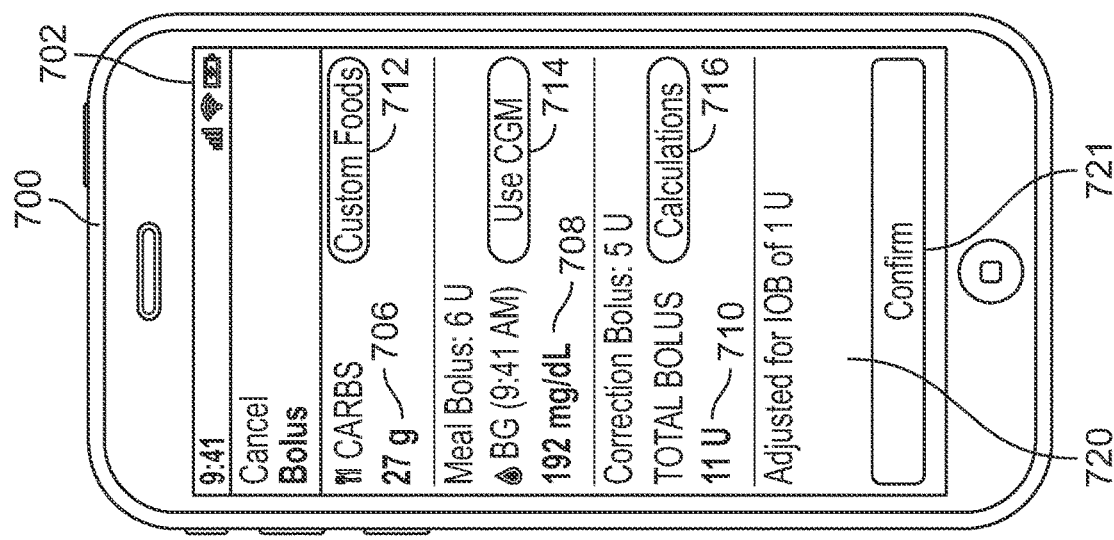
Figure 7:
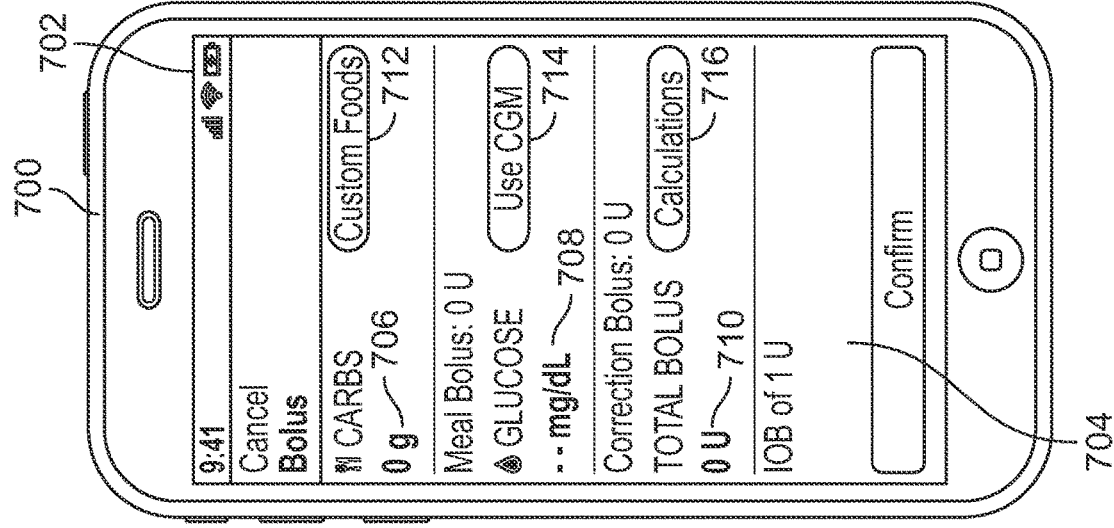
Figure 7:
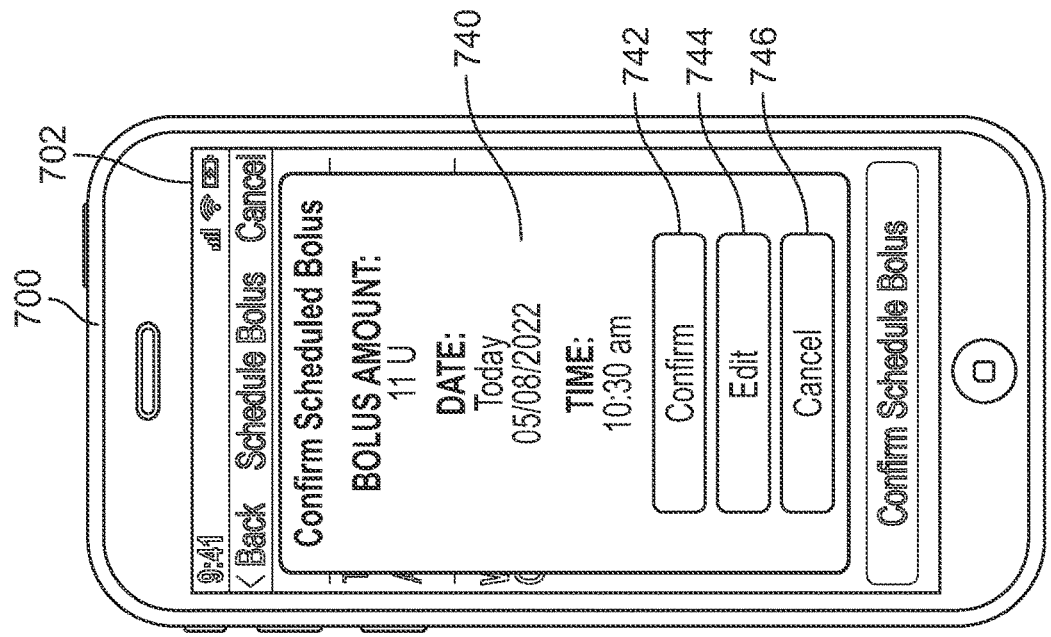
Figure 7:
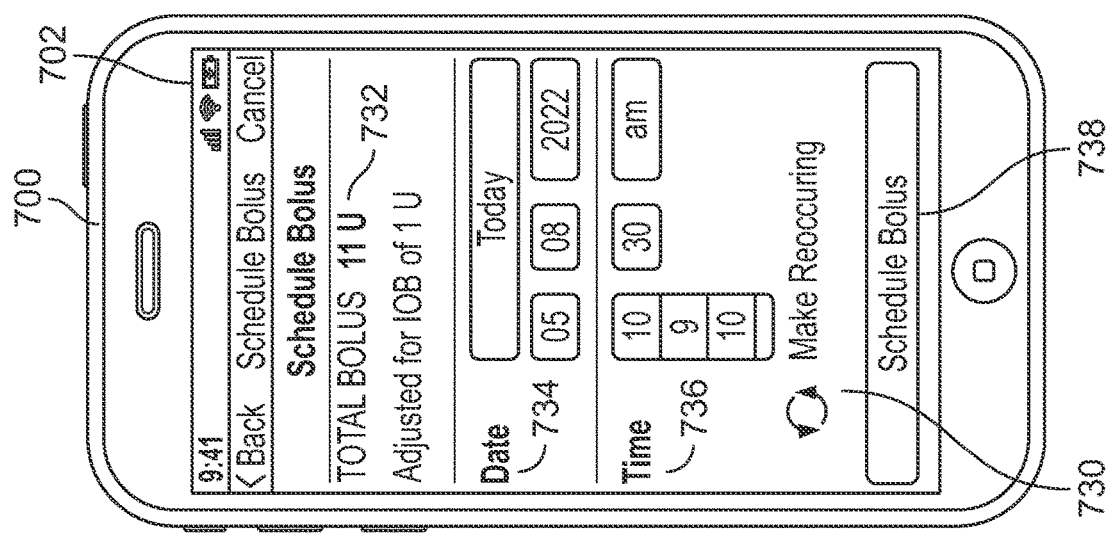

A medicament bolus delivery may also be scheduled using the management device 104, which may be a smartphone. FIG. 7 depicts several display screens that may be displayed and used in exemplary embodiments to schedule a future medicament bolus delivery. As shown in FIG. 7, the user may navigate to a bolus screen 704 on display 702 of a smartphone management device 700. Screen 704 includes a field 706 for the user 108 to enter the amount of carbohydrates in grams for a meal that the user 108 is preparing to eat and that warrants the medicament bolus. The medicament bolus is targeted for offsetting the rise in glucose that the user 108 will experience form eating the meal in this case, where the medicament is insulin. The user 108 may instead select button 712 to select among a list of carbohydrate amounts for known foods. Field 708 is for a glucose value that may be manually entered by the user 108 or may be populated from a value obtained recently by a CGM or other glucose sensor 106 by selecting button 714. Lastly, total bolus field 710 displays the calculated total bolus amount for the medicament bolus. The calculations for determining the total bolus may be displayed by selecting button 716. Screen 720 shows an example wherein the carbohydrate amount has been entered in field 706 and the glucose level has been entered in field 708. The management device 104 has calculated the bolus amount 710 based on the carbohydrates amount and current glucose level of the user 108. In this example, the meal has 27 grams of carbohydrates, and the user has a current glucose level of 192 mg/dL. The management device 104 has calculated the bolus amount as 11 units of insulin.

Once the user 108 selects the confirm button 721, screen 722 may be displayed on display 702 of the management device 700. Screen shows the particulars of the medicament bolus and includes a button 724 that may be selected to begin delivering at least a portion of the medicament bolus immediately. Screen 722 may also include a schedule bolus button 726. Selection of the schedule bolus button 726 causes a schedule bolus screen 730 to be displayed. The schedule bolus screen may include an editable field 732 for the dosage amount of the medicament bolus. Screen 730 may include user interface elements 734 for specifying the date for the medicament bolus to be delivered. Screen 730 may include user interface elements for specifying the time at which the medicament bolus is to be delivered. The user also may select for the scheduled bolus to reoccur based on the sequence chosen by the user, such as daily or weekly. Once the user 108 is comfortable with the bolus amount, date and time values for the medicament bolus, the user 108 may select the schedule bolus 738 button. In response to selection of the schedule bolus button, a pop-up-display 740 may be shown. The pop-up-display 740 may specify the particulars of the scheduled delivery for the medicament bolus. A confirm button 742 may be selected to confirm the scheduling of the delivery of the medicament bolus. An edit button 744 may be selected to enable editing of the particulars of the scheduled medicament bolus delivery. A cancel button 746 may be selected to cancel the scheduling of the medicament bolus delivery.

Figure 8:
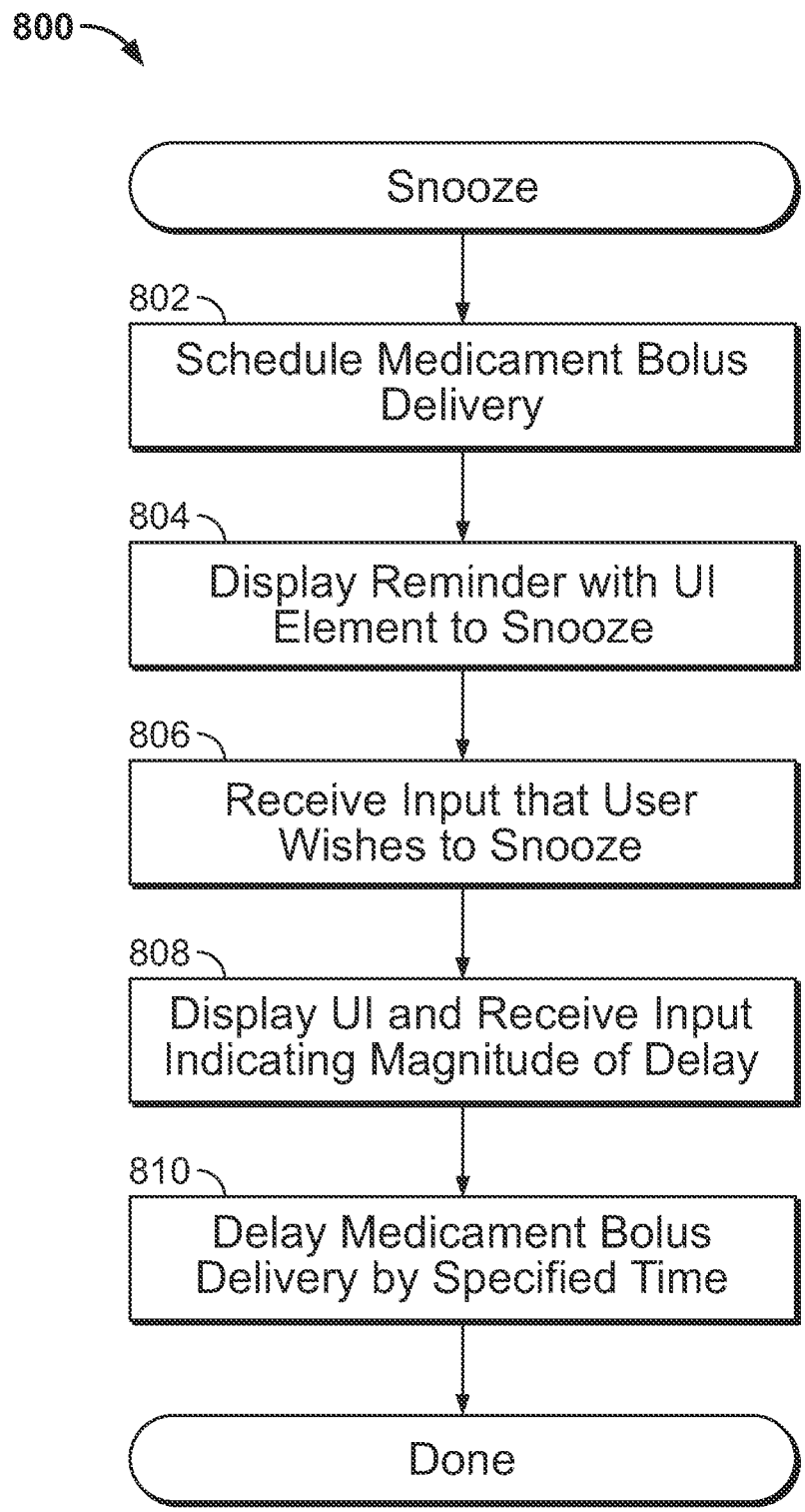
FIG. 8 depicts a flowchart of illustrative steps that may be performed in exemplary embodiments to use snooze functionality.

After a medicament bolus delivery is scheduled, the time may arrive for the scheduled medicament bolus delivery, and a bolus delivery at that time may not be possible or convenient for the user 108. To accommodate such situations, the exemplary embodiments may provide a snooze feature. The snooze feature enables the user 108 to delay the delivery of the medicament bolus by variable amounts of time, such as between 5 minutes to 30 minutes or 5 minutes to 1 hour. FIG. 8 depicts a flowchart 800 of illustrative steps regarding such a snooze feature that may be performed in exemplary embodiments. At 802, a medicament bolus delivery may be scheduled. When the scheduled date and time for the medicament bolus delivery arrives or when a fixed interval before the scheduled date and time arrives, at 804, a reminder to the user 108 may be displayed. The reminder may include a user interface element for invoking the snooze feature to delay the scheduled medicament bolus delivery. At 806, input is received from the user 108 indicating that the user wishes to invoke the snooze feature. At 808, a user interface may be displayed that facilitates the user providing input regarding the magnitude of delay that is desired, and the input is received from the user via the user interface. At 810, the medicament bolus delivery is delayed by the specified amount of time.

Figure 9:
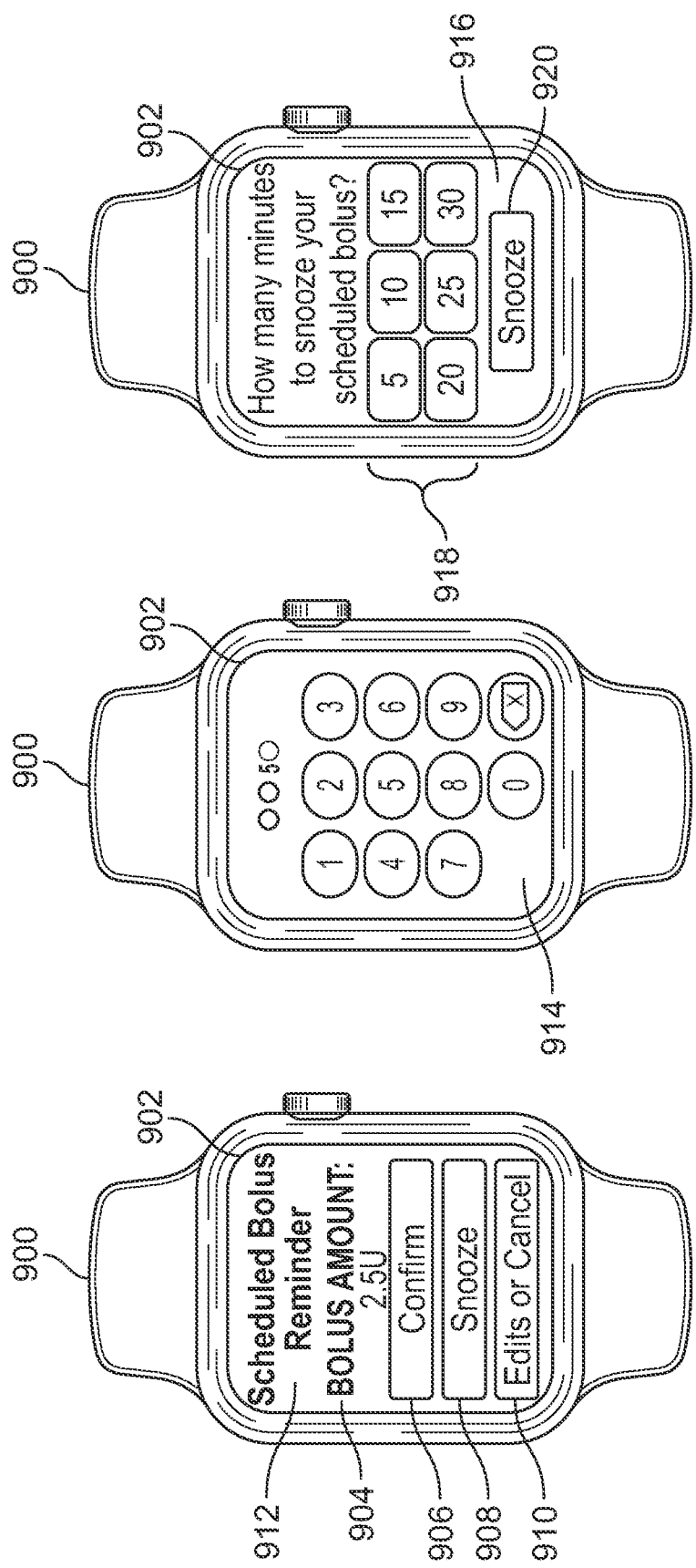
FIG. 9 depicts illustrative display screens of exemplary embodiments on a smartwatch for accessing snooze functionality.

FIG. 9 depicts an example of screen displays that may be shown on a smartwatch 900 in exemplary embodiments to invoke the snooze feature from a reminder. The user 108 may determine, by using the smartwatch controls, such as a dial or a touchscreen user interface, the amount, the date, and the time when the application 148 will prompt a scheduled bolus reminder. Screen 912 shown on smartwatch display 902 in FIG. 9 depicts an illustrative scheduled bolus reminder. Screen 912 depicts the bolus amount 904 of medicament that is scheduled to be delivered. A confirm button 906 is provided for selection to confirm the scheduled medicament bolus particulars.

A snooze button 908 also is displayed. Selection of the snooze button 908 delays the scheduled bolus by a determined amount of time. When the user 108 selects the snooze button 908, screen 914 may displayed for the user to enter a code indicating that the user is authorized to delay the scheduled medicament bolus delivery. The code may be the same code that the user uses to unlock smartwatch 900 or another device. Alternatively, a biometric identification may be used. For example, a camera on smartwatch 900 may identify the user's face or eyes and thereby confirm that the user is indeed the one entering the command to snooze delivery of a bolus. Once the user has entered the code correctly, or the user's identity is otherwise verified, screen 916 may be displayed. In alternative embodiments, screen 916 may immediately follow screen 912, such that no code or user identification is required. On screen 916, the user 108 is presented with buttons 918 that may be selected to choose among the options for the magnitude of the snooze (e.g., 5, 10, 15, 20, 25 or 30 minutes). The user may also or alternatively be presented with the option to enter a user-defined snooze time. The user 108 may effectuate the delay by selecting snooze button 920.

Figure 10:
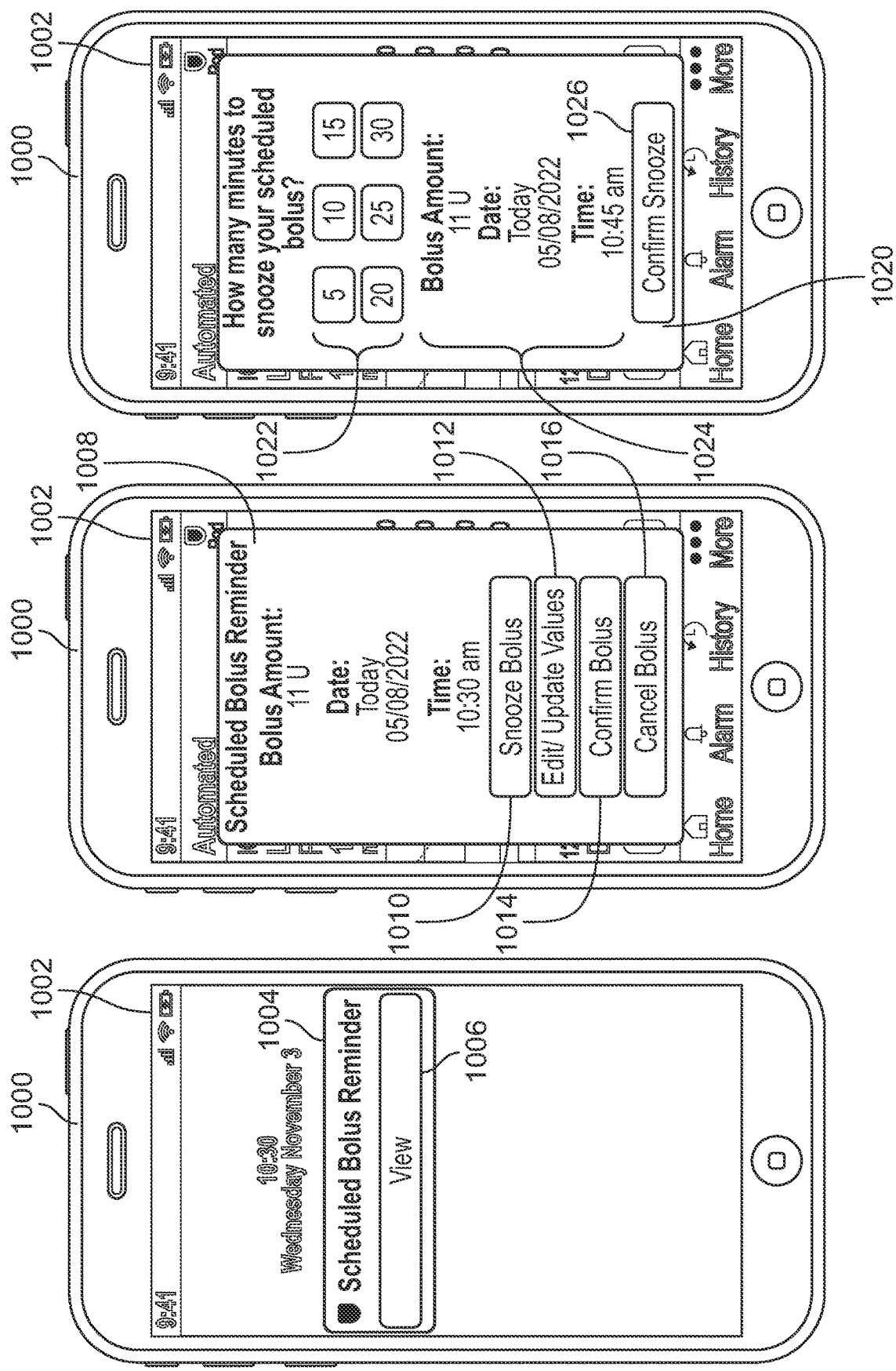
FIG. 10 depicts illustrative display screens of exemplary embodiments on a smartphone management device for accessing snooze functionality.
Figure 10:
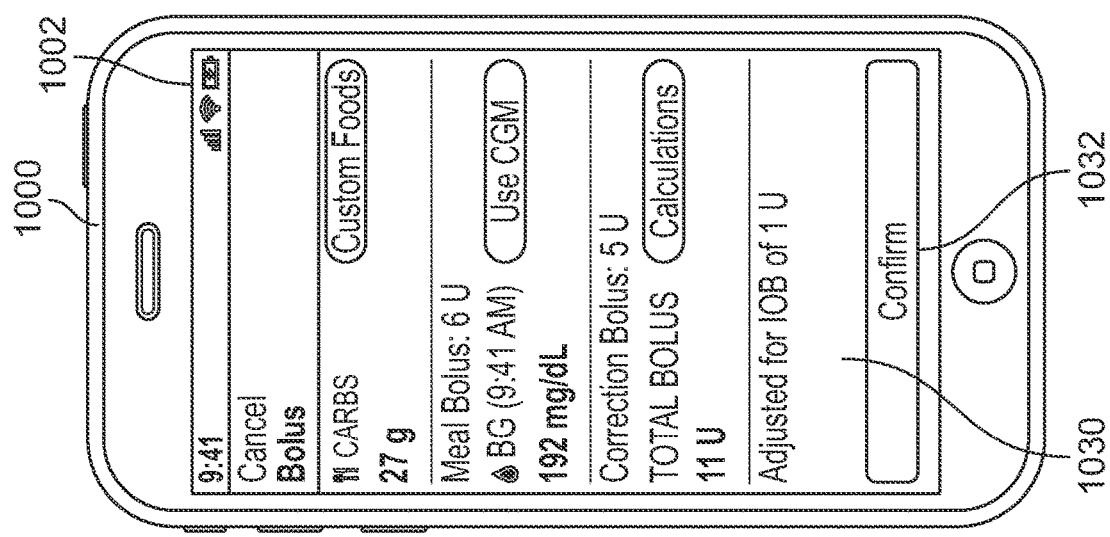

FIG. 10 depicts an example of display screens that may be displayed in invoking the snooze feature with a smartphone management device 102. A pop-up-scheduled bolus reminder 1004 is shown on display 1002 of management device 104. The reminder 1004 includes a button 1006 that may be selected by a user 108 to view the reminder. FIG. 10 depicts an illustrative reminder 1008 that may be displayed responsive to selection of the view button 1006. The reminder 1008 lists the particulars of the scheduled medicament bolus delivery. In addition, the reminder 1008 may include multiple buttons for selection by the user 108. The buttons include a snooze bolus button 1010 that may be selected to invoke the snooze functionality. An edit/update button 1012 may be selected to change the particulars of the scheduled medicament bolus delivery as is described below. A confirm bolus 1014 button may be selected to proceed with delivery of the scheduled medicament bolus to the user 108. A cancel button 1016 may be selected to cancel the scheduled medicament bolus delivery.

When the user 108 selects the snooze bolus button 1010, screen 1020 may be displayed on screen 1002 of management device 1000. Screen 1020 includes user interface elements for selecting associated snooze delays ranging from 5 minutes to 30 minutes. The user may also or alternatively be presented with the option to enter a user-defined snooze time. The screen 1020 includes the scheduled medicament bolus delivery particulars 1024. Screen 1020 also includes a confirm snooze button that may be selected to confirm the specified snooze delay. After specifying the snooze delay, a screen 1032 may be displayed on the display 1002 of the smartphone management device 1000. The screen shows the particulars of the delayed medicament bolus. The user 108 may then confirm the delayed medicament bolus delivery by selecting the confirm button 1032.

Figure 11:
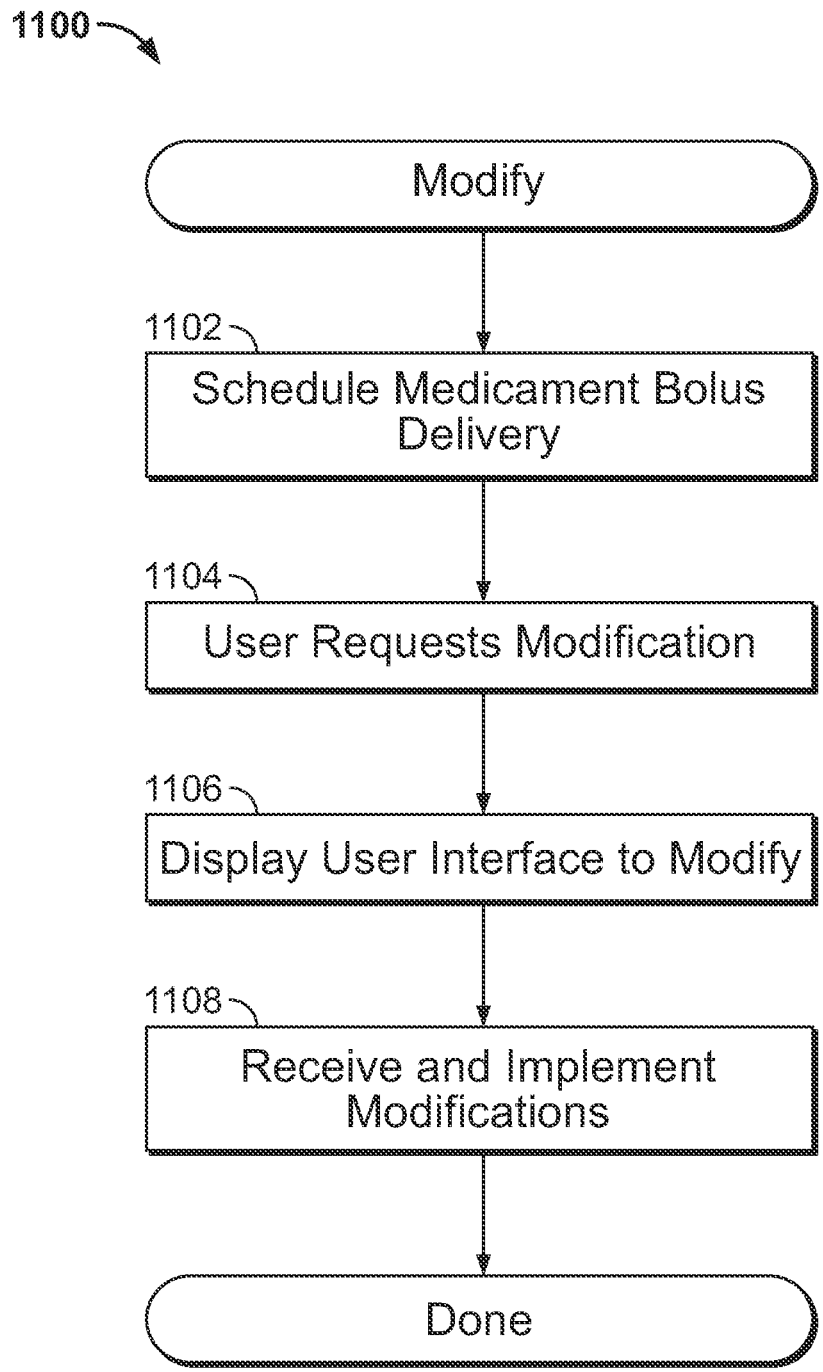
FIG. 11 depicts a flowchart of illustrative steps that may be performed in exemplary embodiments to modify a scheduled medicament bolus delivery.

The user 108 may modify a scheduled medicament bolus delivery. FIG. 11 depicts a flowchart 1100 of illustrative steps that may be performed in exemplary embodiments in modifying a scheduled medicament bolus delivery. At 1102, a medicament bolus delivery is scheduled, such as described above. At 1104, the user 108 requests a modification to the scheduled medicament bolus delivery. At 1106, a user interface is displayed to enable modification to the scheduled medicament bolus delivery, and the user 108 enters the modifications via the user interface. At 1108, the modifications are received and implemented.

Figure 12A:
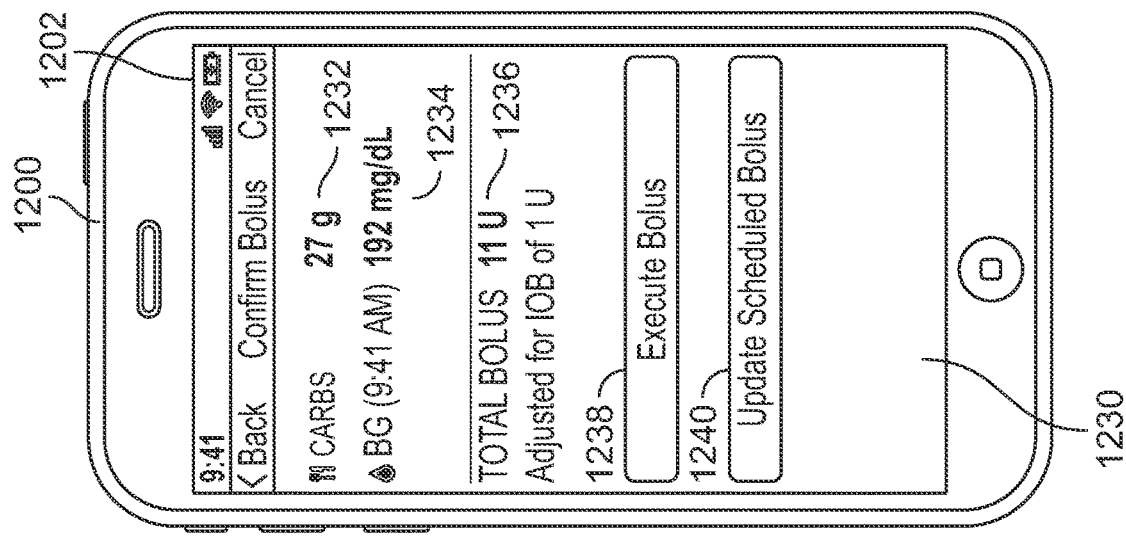
FIG. 12A depicts illustrative display screens of exemplary embodiments on a smart phone management device for editing or updating a scheduled medicament bolus delivery.
Figure 12A:
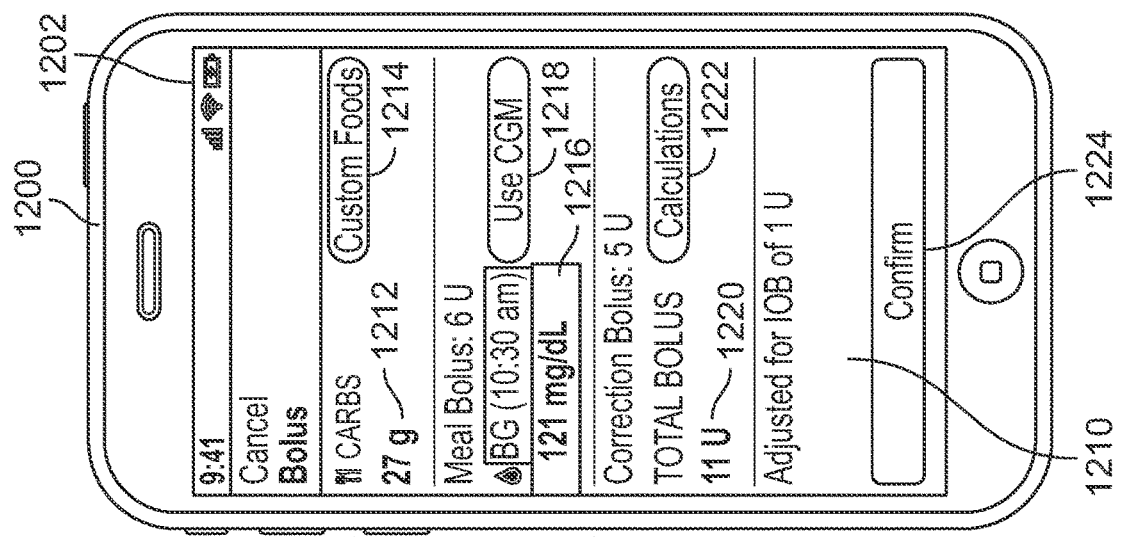
Figure 12A:
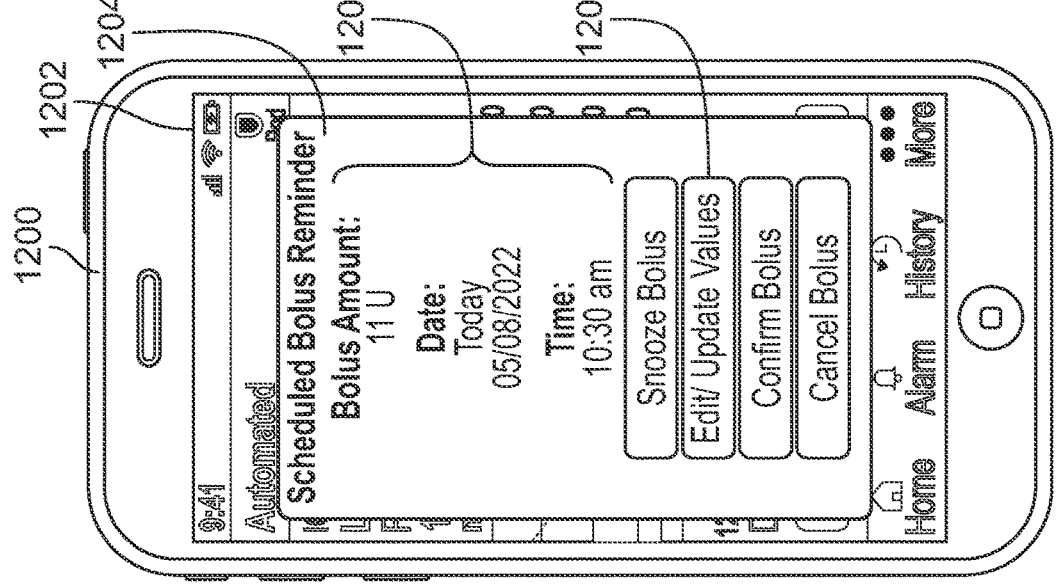
Figure 12A:
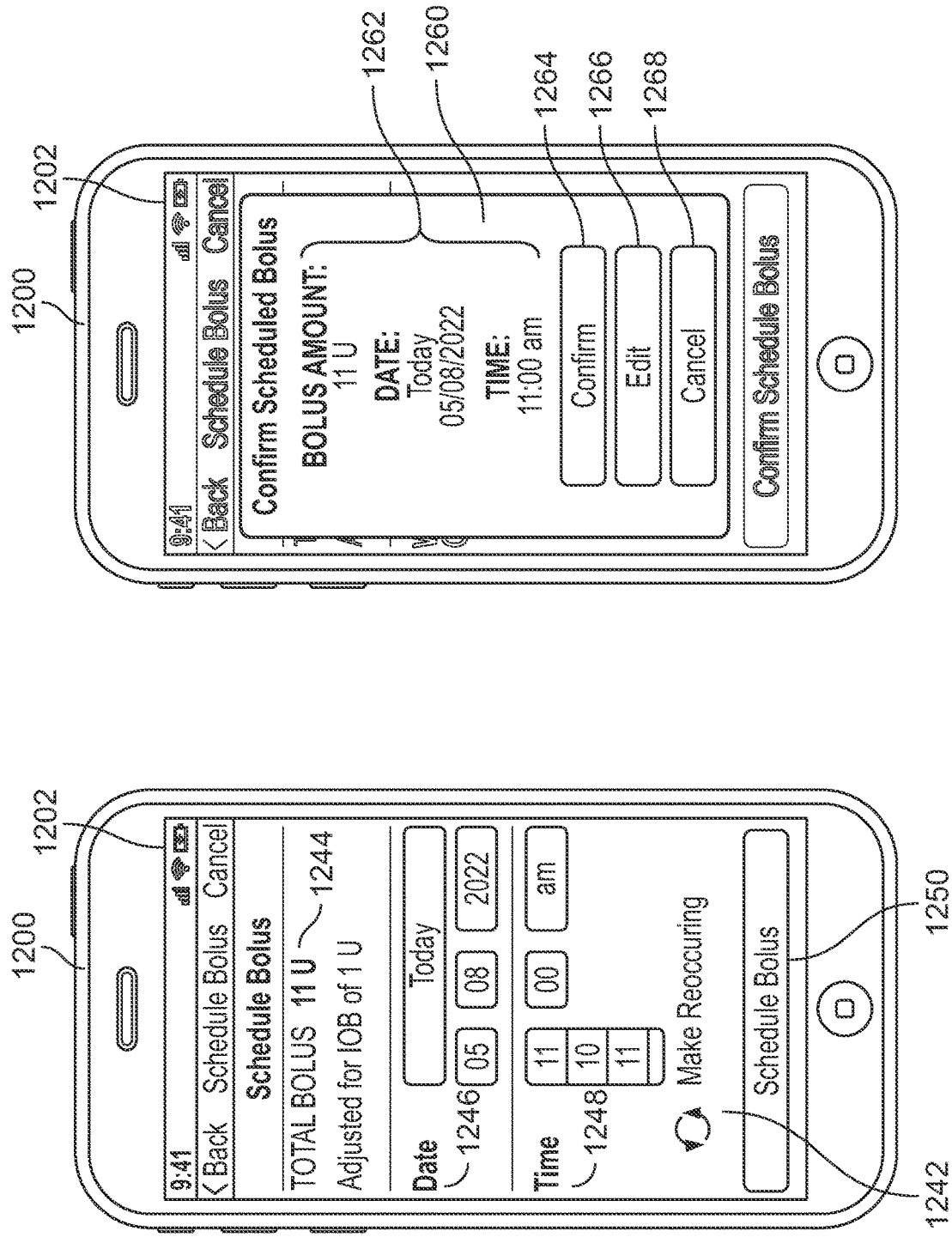

FIG. 12A depicts illustrative screens on a smartphone management device 104 that may be displayed in modifying a scheduled medicament bolus delivery for a user 108. As was mentioned above, a scheduled bolus reminder 1204 may be displayed on a display 1202 of a smartphone management device 1200. The reminder 1204 includes a listing of the scheduled medicament bolus delivery particulars 1206. The reminder 1204 also includes an edit/update values button 1208 that may be selected to modify particulars of the scheduled medicament bolus delivery. When the user 108 selects the edit/update values button 1208, a screen 210 is displayed with editable fields that may be modified. A carbohydrates amount field 1212 may be modified by entering a value or by selecting from a list of carbohydrates amounts for common foods that is displayed in response to selecting button 1214. A glucose level field 1216 may be modified by entering a value or by selecting button 1218 to have a CGM or other sensor 106 provide the latest glucose level reading. A total bolus field 1220 is included to show the bolus amount that has been calculated by a calculator running on the smartphone management device 104. The details of the calculation may be displayed by selecting button 1222. Once the user 108 has made the desired changes, the user may confirm the changes by selecting the confirm button 1224.

Once the confirm button 1224 is selected, screen 1230 may be displayed on the display 1202 of the smartphone management device 1200. Screen 1230 lists the confirmed values for the carbohydrates amount 1232, the current glucose level of the user 1234 and the total bolus amount 1236. A button 1238 is displayed to deliver the bolus immediately, and a button 1240 is provided to update the scheduled medicament bolus delivery. Selection of the update scheduled bolus button causes the display of screen 1242, which enables the particulars of the scheduled medicament bolus delivery to be modified. The total bolus field 1244 may be edited. User interface elements 1246 enable the editing of the date of the scheduled medicament bolus delivery, and user elements 1248 enable the editing of the time of the scheduled medicament bolus delivery. Once the user 108 has made the desired modifications, the user 108 may select the schedule bolus button 1250 to schedule the modified medicament bolus delivery. A conformation screen 1260 is displayed in response to selection of the schedule bolus button 1250. The confirmation screen 1260 lists the particulars of the modified scheduled medicament bolus delivery. A confirm button 1264 may be selected to confirm the modified scheduled medicament bolus delivery. An edit button 1266 may be selected to make additional changes to the modified scheduled medicament bolus delivery. A cancel button 1268 may be selected to cancel modified scheduled medicament bolus delivery.

Figure 12B:
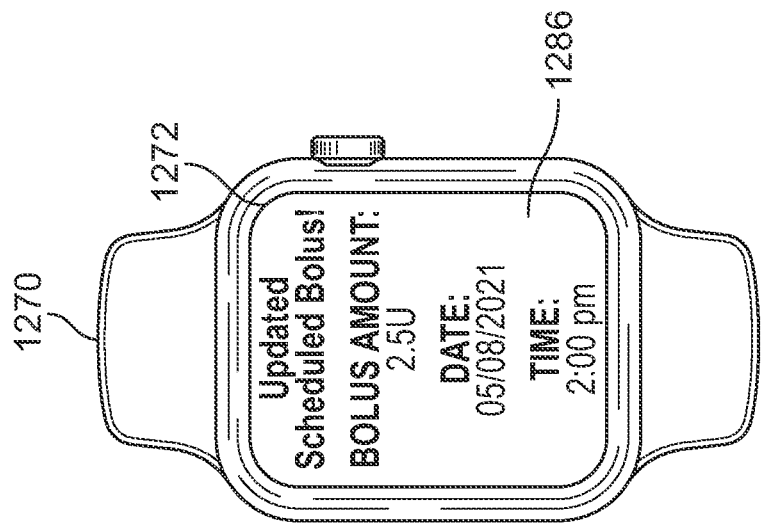
FIG. 12B depicts illustrative display screens of exemplary embodiments on a smartwatch for editing or updating a scheduled medicament bolus delivery.
Figure 12B:
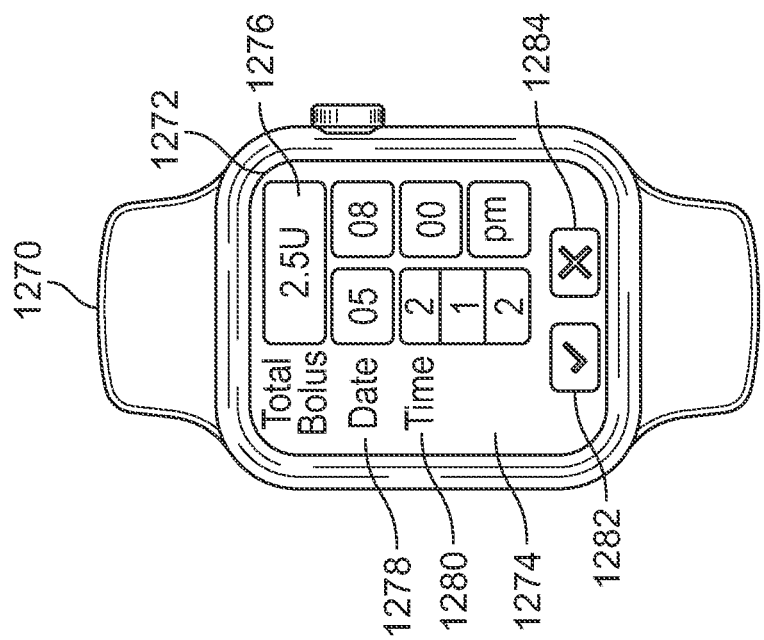

FIG. 12B depicts screens that may be displayed in exemplary embodiments on a display 1272 of a smartwatch 1270 to modify a scheduled medicament bolus delivery. Screen 1274 may be displayed in response, for example, to a user selecting the edit/cancel button 910 of FIG. 9 or another user interface element. Screen 1274 includes an editable text box 1276 for modifying the total bolus amount. Screen 1274 includes user interface elements 1278 for modifying the date of the scheduled medicament bolus delivery, and user interface elements 1280 for modifying the time of the scheduled medicament bolus delivery. Screen 1274 includes a button 1282 for accepting changes and a button 1284 for rejecting changes. If the user 108 selects the button 1282, a confirmation screen 1286 listing the bolus amount, date and time for the scheduled medicament bolus delivery may be displayed on the display 1272 of the smartwatch 1270.

Figure 13:
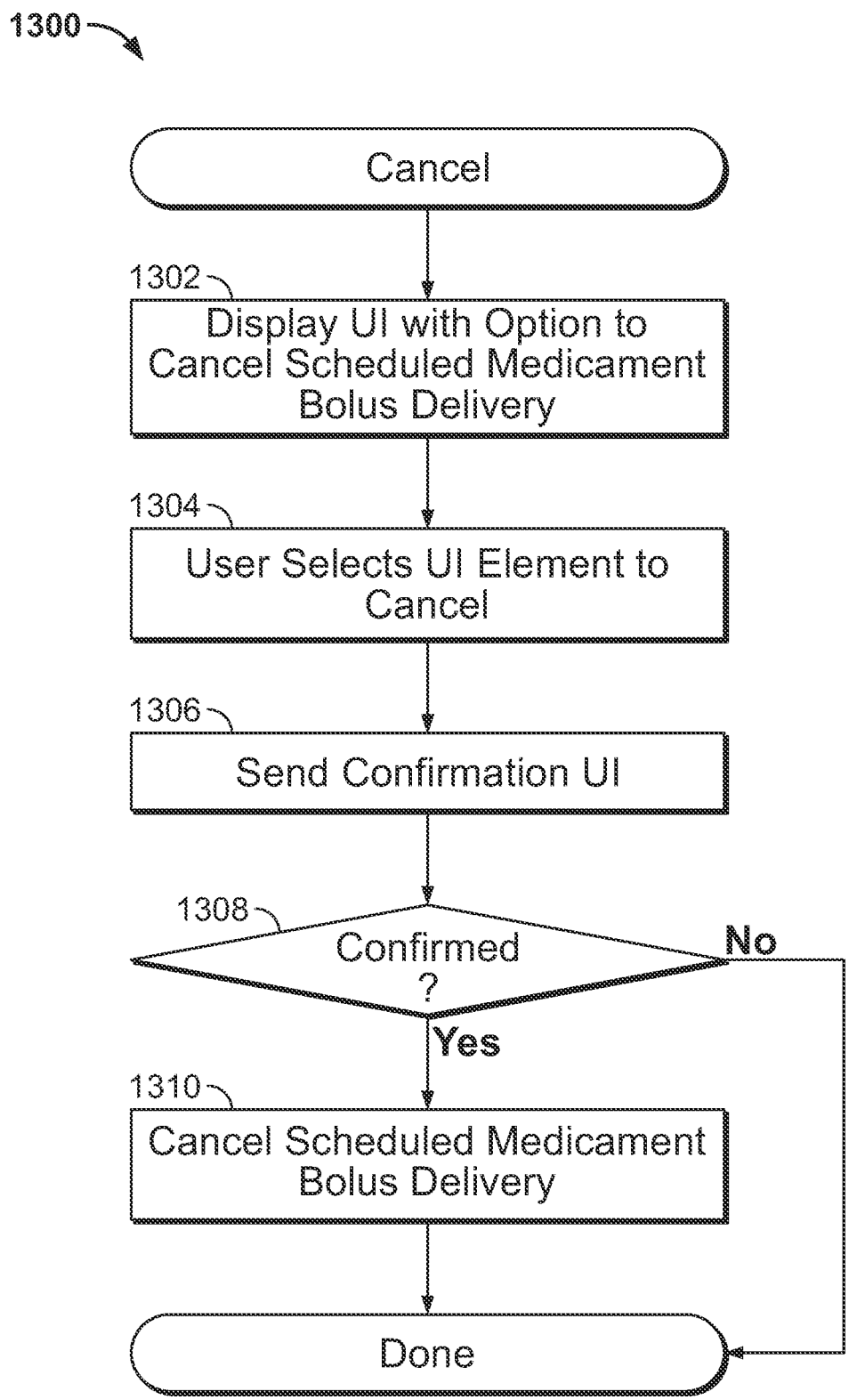
FIG. 13 depicts a flowchart of illustrative steps that may be performed in exemplary embodiments to cancel a scheduled medicament bolus delivery.

One of the other options for modifying a scheduled medicament bolus delivery is to cancel the delivery. FIG. 13 depicts a flowchart 1300 of illustrative steps that may be performed in exemplary embodiments to cancel a scheduled medicament bolus delivery. At 1302, a user interface is displayed to cancel a scheduled medicament bolus delivery. At 1304, the user 108 selects a user interface element on the user interface to cancel the scheduled medicament bolus delivery. At 1306, a confirmation of the cancelation is displayed to the user 108. At 1308, if the user 108 confirms the cancelation, the scheduled medicament bolus delivery is canceled. If not, no further action is taken, and the medicament bolus delivery remains scheduled.

Figure 14:
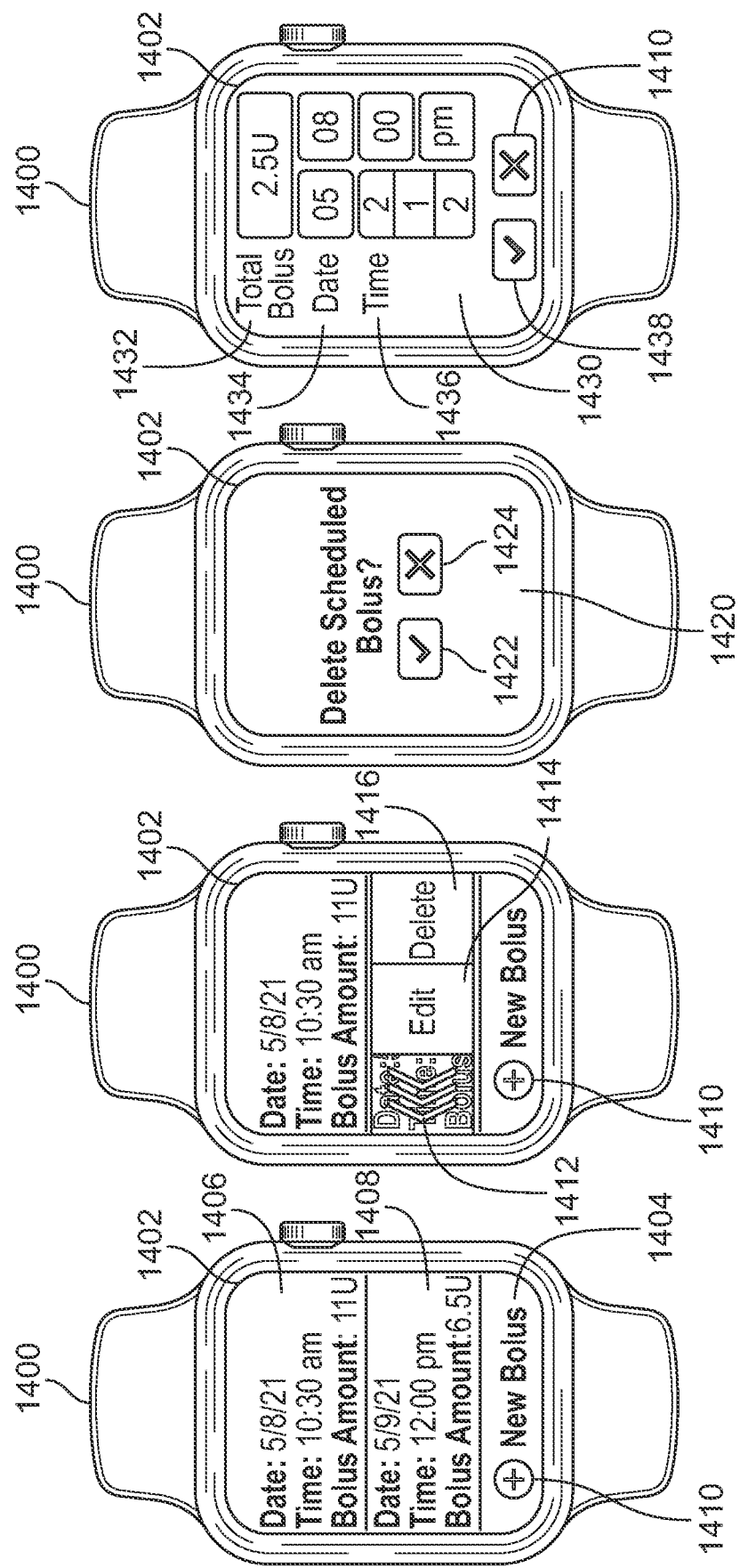
FIG. 14 depicts illustrative display screens of exemplary embodiments on a smartwatch for adding a scheduled medicament bolus delivery, canceling a scheduled medicament bolus delivery and modifying a scheduled medicament bolus delivery.

As shown in FIG. 14 for a smartwatch 1400, a user 108 may view on display 1402 a list of when multiple medicament boluses are scheduled to be delivered. Screen 1404 may be displayed, for example. This screen 1404 may act as a path to deleting a scheduled medicament bolus delivery. In this illustrative case, the information 1406 for a first scheduled bolus is displayed on the screen 1404, and information 1408 for a second scheduled bolus is displayed on the screen 1404. A user interface element 1410 for scheduling a new bolus may also be displayed on screen 1404. When the displayed information 1408 for the second scheduled bolus is selected by swiping left, arrow icon 1412 is displayed to evidence the swipe. In addition, an edit button 1414 may be displayed to cause editing of the second scheduled bolus. A delete button 1416 may be displayed for deleting the second scheduled bolus. When the delete button 1416 is selected, a button 1422 may be displayed on screen 1420 to confirm the deletion, and a cancel button 1424 may be displayed for canceling the deletion. If the user 108 selects the edit button 1414, an edit screen 1430 is displayed. The edit screen 1430 includes user interface elements 1432, 1434 and 1436 for editing the bolus amount, date, and time, respectively, of the second scheduled bolus. The edited particulars for the second scheduled bolus may be accepted by selecting button 1438 or may be rejected by selecting button 1440.

Figure 15:
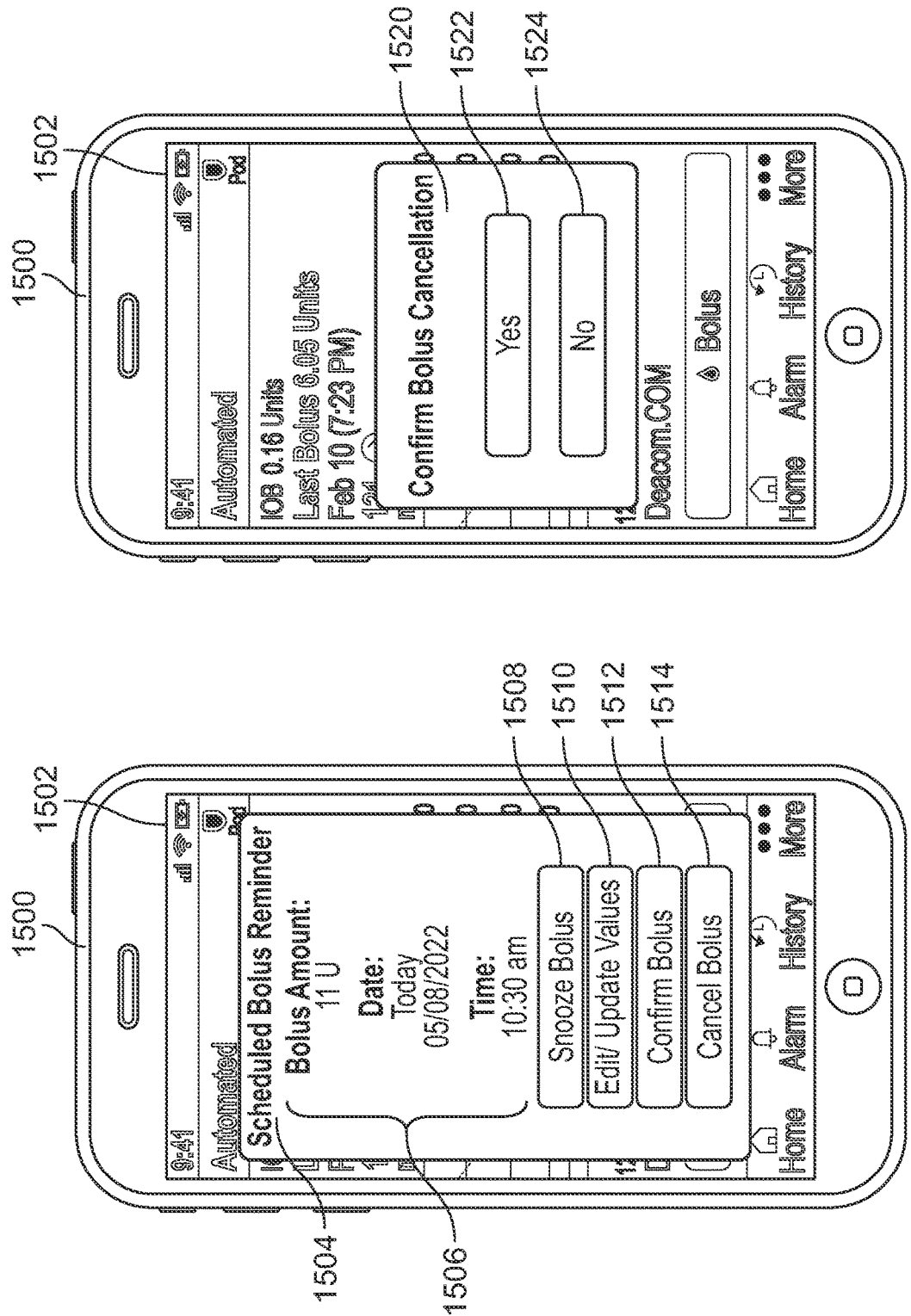
FIG. 15 depicts illustrative display screens of exemplary embodiments on a smartphone management device for canceling a scheduled medicament bolus delivery.

A scheduled medicament bolus delivery may be canceled from a reminder screen in some exemplary embodiments. FIG. 15 depicts an illustrative reminder 1504 that is displayed on a display 1502 of a smartphone management device 1500. The reminder 1504 lists the particulars 1506 for the scheduled medicament bolus delivery. The reminder 1504 includes a snooze button 1508, which may be selected by the user 108 to invoke snooze functionality as discussed above. The reminder also includes an edit/update values button 1510, which may be selected by the user 108 to edit or update the particulars of the scheduled medicament bolus delivery as discussed above. The reminder 1504 further may include a confirm bolus button 1512, which the user 108 may select to confirm the scheduled medicament bolus delivery. The reminder 1504 still further may include a cancel button 1514, which the user 108 may select to cancel the scheduled medicament bolus delivery. Selection of the cancel button may result in the display of a confirmation pop-up 1520. The confirmation pop-up may include a "Yes" button, which the user 108 may select to confirm the cancelation and a "No" button, which the user 108 may select to reject the cancelation.

Figure 16:
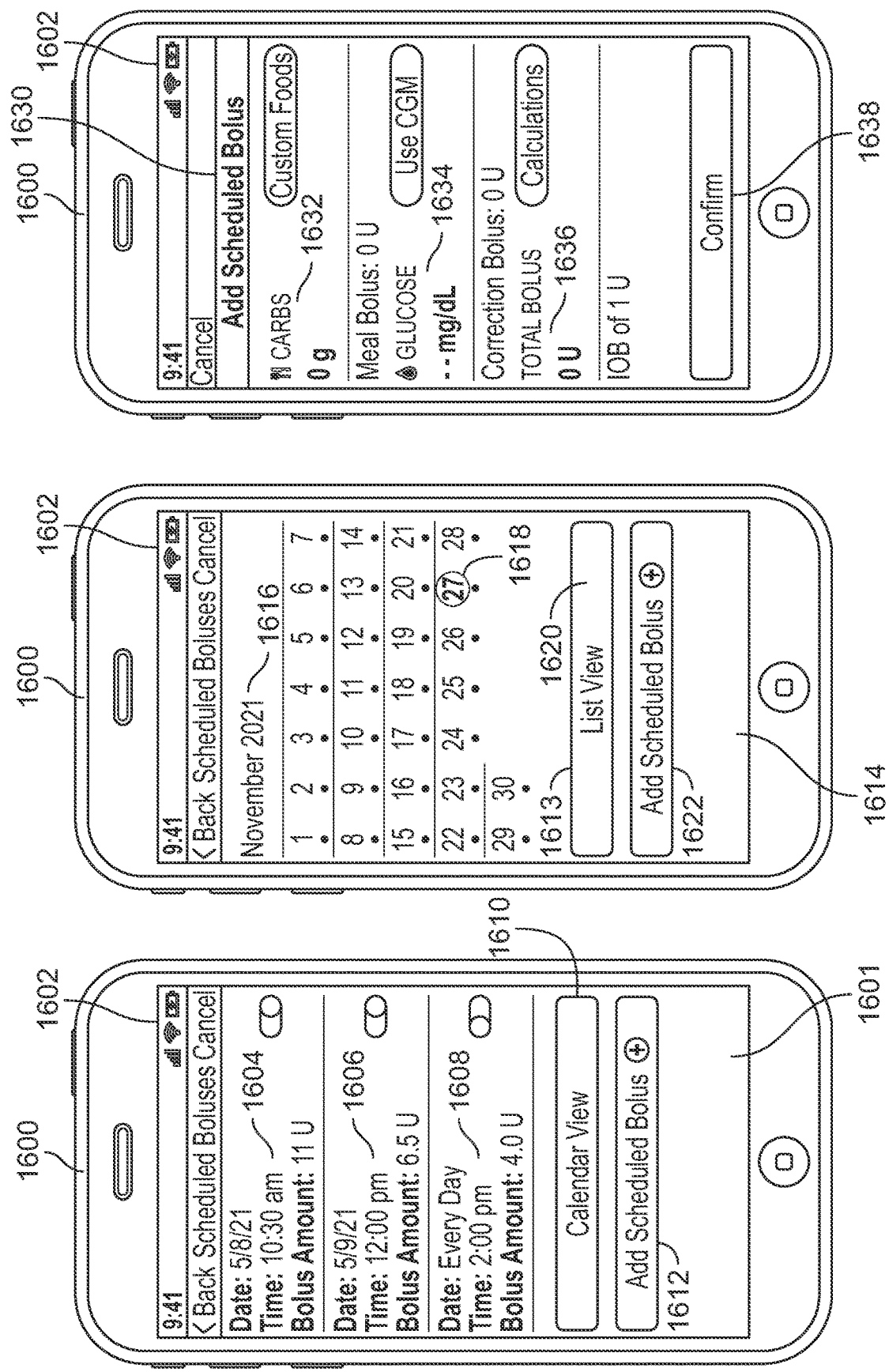
FIG. 16 depicts illustrative display screens on a smartphone management device for deleting a scheduled medicament bolus delivery from a list view of scheduled medicament bolus deliveries.
Figure 16:
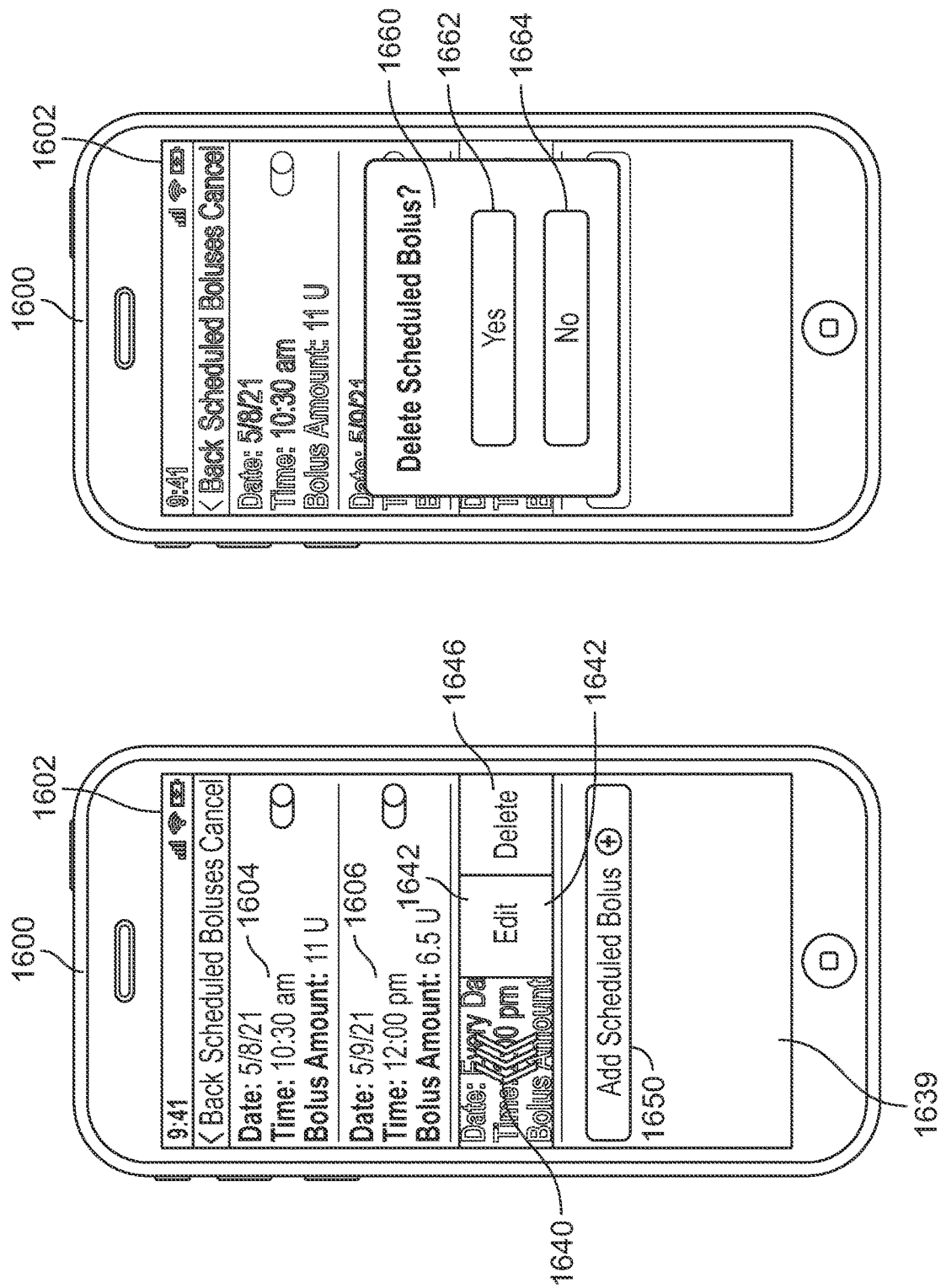

Another way in which the user 108 may cancel a scheduled medicament bolus delivery with a smartphone management device 104 is by navigating to a list view of scheduled medicament bolus deliveries. FIG. 16 depicts an illustrative screen 1601 shown on a display of smartphone management device 1600. The screen 1601 provides a list view of scheduled medicament bolus deliveries for the user 108. Screen 1601 includes entries 1604, 1606 and 1608 for respective scheduled medicament bolus deliveries. An add scheduled bolus button 1612 may be selected by the user 108 to add an additional scheduled medicament bolus delivery. A calendar view button 1610 may be provided to navigate to a calendar view, such as illustrative calendar view 1614. The calendar view 1614 may contain a monthly calendar 1616 of dates that may be selected to display scheduled medicament bolus deliveries for the selected dates. The date of November 27 is highlighted 1618 to indicate the current date. Additionally or alternatively, calendar view 1614 may contain a weekly calendar showing the days of the week, with or without particular dates. For example, Sunday through Saturday may be shown, and the user may identify which days a recurring bolus should occur, e.g., every Friday at 6:30 pm, or every Sunday at 9:45 am. A user 108 may return to the list view by selecting the list view button 1613.

A new medicament bolus delivery may be scheduled from the calendar view by selecting the add scheduled bolus button 1622. Selection of the add scheduled bolus button 1622 may cause the add scheduled bolus screen 1630 to be displayed. Editable fields 1632, 1634 and 1636 are provided for the carbohydrates amount, glucose level of the user 108 and a total bolus amount 1636. Values may be confirmed by the user 108 selecting a confirm button 1638.

A user may swipe left, for example, on a scheduled medicament bolus delivery entry in the list view to edit or delete the scheduled medicament bolus delivery associated with the entry. As shown in FIG. 16, screen 1639 shows an example where the user has swiped left over entry 1608 to cause the arrow icon 1640, edit button 1642 and delete button 1646 to be displayed. An add scheduled bolus button 1650 also is displayed. Selection of the delete button 1646 may cause a pop-up 1660 to be displayed. The pop-up 1660 includes a "Yes" button 1662 for deleting the scheduled medicament bolus delivery and a "No" button 1664 for not deleting the scheduled medicament bolus delivery. Alternatively, the scheduled medicament bolus may be deleted without a pop-up.

Figure 17:
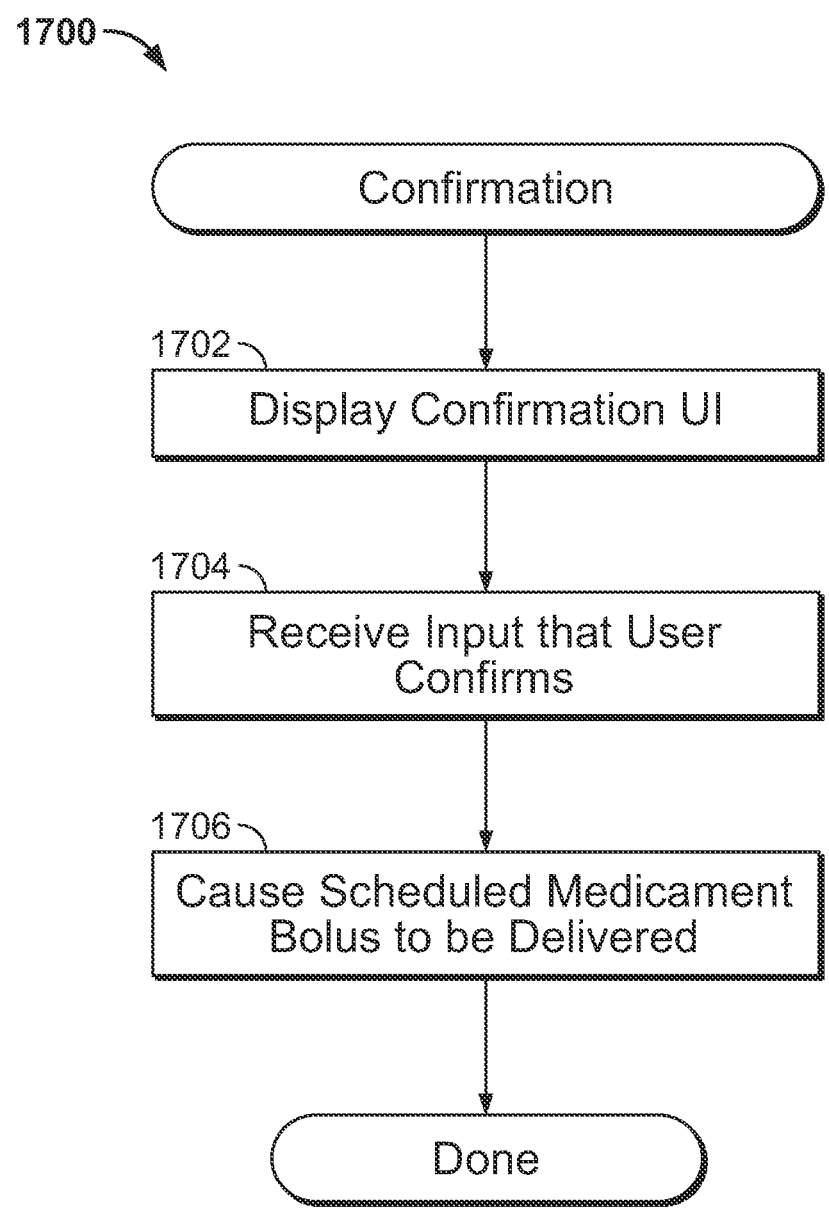
FIG. 17 depicts a flowchart of illustrative steps that may be performed in exemplary embodiments to provide a confirmation of a scheduled medicament bolus delivery.

A confirmation screen may be provided to confirm a scheduled medicament bolus delivery so that the delivery is confirmed before being delivered. FIG. 17 depicts a flowchart of illustrative steps that may be performed to realize such confirmation in exemplary embodiments. At 1702, a confirmation user interface may be displayed. At 1704, the user provides input via the user interface that the scheduled medicament bolus delivery is confirmed. At 1706, the computing device, such as the management device 104, smartwatch 130, vehicle infotainment system or the like, causes the scheduled medicament bolus delivery to be delivered by the medicament delivery device 102 to the user 108. The computing device may send a message or command to the medicament delivery device 102 to cause the delivery.

Figure 18:
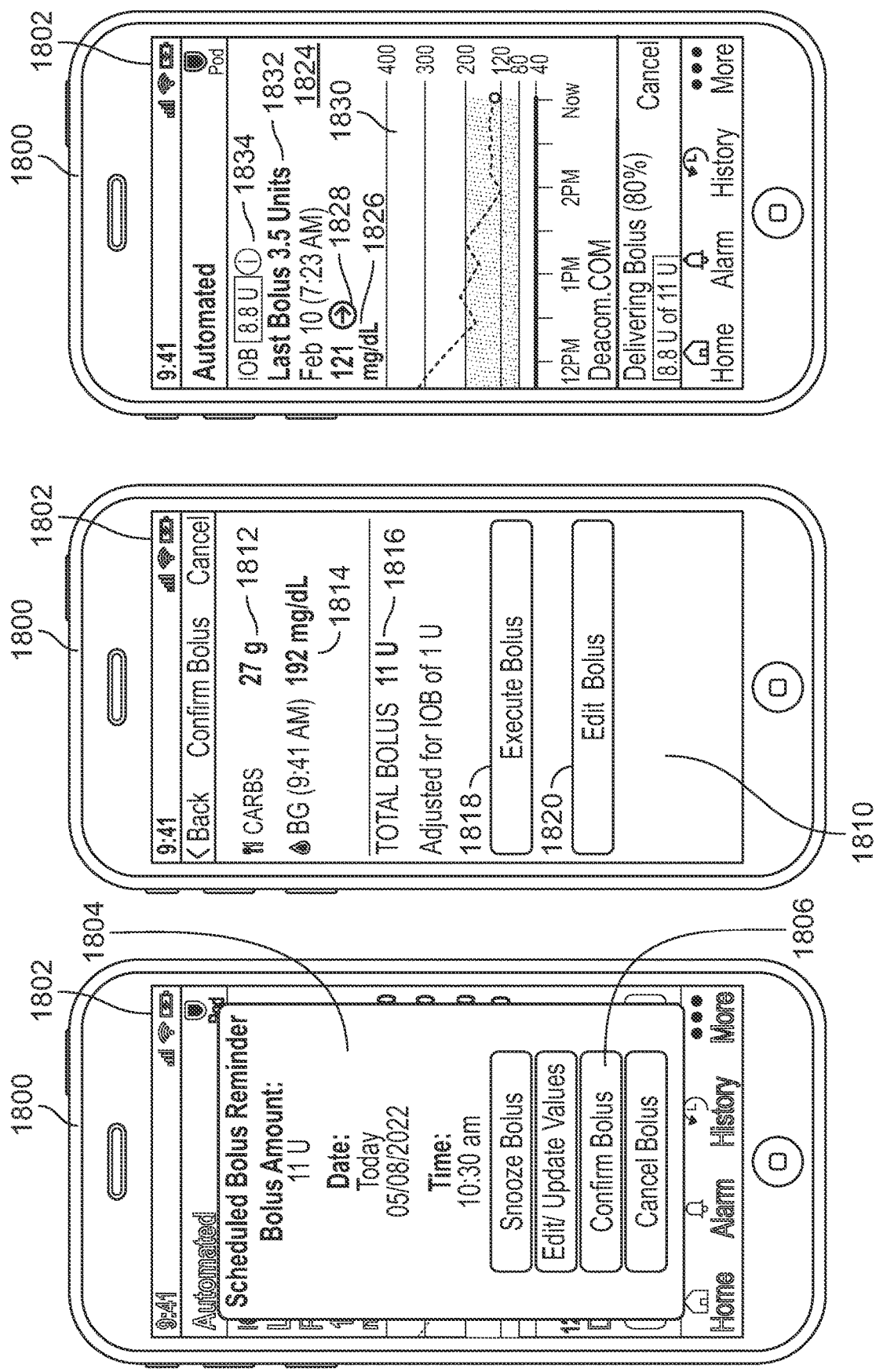
FIG. 18 depicts illustrative display screens on a smartphone management device for executing a scheduled medicament bolus delivery.

FIG. 18 depicts an example where such a confirmation is displayed on the display 1802 of a smartphone management device 1800. Initially, a scheduled bolus reminder 1804 is displayed, such as was described above relative to scheduled bolus reminder 1204 of FIG. 12. The confirm bolus button 1806 may be selected by the user 108 to cause confirmation screen 1810 to be displayed on the display 1802. The confirmation screen 1810 lists a carbohydrates amount 1812 for a meal to be ingested, a current glucose level 1814 for the user 108 and a total bolus amount 1816. If the user 108 wishes to edit the particulars, the user 108 may select an edit bolus button 1820. If the user 108 wishes to deliver the scheduled medicament bolus delivery, the user 108 selects the execute bolus button 1818. Once the user 108 selects the execute bolus button 1818, the home screen 1824 may be displayed. The home screen 1824 may include a latest glucose level 1826 for the user 108, a trend arrow icon 1828 indicating the current trend in glucose level, a plot of recent glucose levels, a date and time of the last bolus delivery 1832 and an insulin on board (JOB) value 1834 for the user 108.

While exemplary embodiments have been described herein, it should be appreciated that various changes in form and detail may be made without departing from the intended scope of the claims appended hereto.

The invention claimed is:

1. A method performed by a processor of a smartwatch, comprising:
displaying a user interface on the display of the smartwatch, the user interface for soliciting information from a user regarding a desired time for scheduling a medicament bolus delivery from a medicament delivery device; and
based on information received via the user interface, with the processor,
determining that a user wishes to schedule the medicament bolus delivery from the medicament delivery device for a future time;
responsive to the determining, beginning scheduling of the medicament bolus delivery by forwarding an instruction from the smartwatch to a management device to instruct the medicament delivery device to schedule the medicament bolus delivery to the user for a future time,
wherein the management device is a handheld device and wherein the management device controls delivery of medicament by the medicament delivery device.

2. The method of claim 1, wherein the user interface solicits a desired time and a desired date for scheduling the medicament bolus delivery from the user.

3. The method of claim 2, wherein the user interface solicits a dosage amount for the medicament bolus delivery from the user.

4. The method of claim 1, wherein the medicament includes insulin, glucagon, a glucagon-like peptide-1 (GLP-1) agonist, or pramlintide.

5. The method of claim 1, wherein the medicament is one of an analgesic, an antibiotic, an anti-viral agent, an anti-depressant agent, an anti-addiction agent, an anti-anxiety agent, a pain-relieving agent, an antipsychotic agent, an anti-seizure agent, a blood thinning agent, a chemotherapy agent, a hormonal agent, an infertility agent, a statin, a blood pressure controlling agent, an antacid, a birth control agent, a fertility agent, an anti-inflammatory agent, a cardiovascular agent, a muscle relaxant, a sleep disorder agent or a sexual disorder agent.

6. The method of claim 1, further comprising displaying a reminder of the scheduled medicament bolus delivery on the display before the delivery occurs.

7. A method performed by a processor of a vehicle infotainment system or a smartwatch, and the method, comprising:
displaying a first user interface on a display of the vehicle infotainment system or a display of the smartwatch, the first user interface for soliciting information from a user regarding a desired time for scheduling delivery of a medicament bolus from a medicament delivery device;
based on information received via the first user interface, with the processor,
determining that a user wishes to schedule the delivery of a medicament bolus from the medicament delivery device for a future time;
responsive to the determining, beginning scheduling of the medicament bolus delivery by forwarding an instruction from the vehicle infotainment system or the smartwatch to a management device to instruct the medicament delivery device to schedule the delivery of the medicament bolus to the user for a future time,
wherein the management device is a handheld device and wherein the management device controls delivery of medicament by the medicament delivery device;
with the processor of the vehicle infotainment system or the smartwatch, causing a second user interface element to be displayed on the display of the vehicle infotainment system or the smartwatch, the user interface element being activatable to delay the scheduled delivery of the medicament bolus; and
based on input received via the user interface element, with the processor, sending a communication from the vehicle infotainment system or the smartwatch to the management device to cause the delivery of the medicament bolus to be delayed to a delayed time that is after the scheduled time.

8. The method of claim 7, further comprising displaying an additional user interface on the display to facilitate the user selecting a magnitude of how much the delivery of the medicament bolus is to be delayed relative to the scheduled time.

9. The method of claim 8, wherein the additional user interface includes elements for selection where each element is associated with a different magnitude of delay for the delivery of the medicament bolus.

10. A method performed by a processor of a smartwatch or a vehicle infotainment system, comprising:
displaying a user interface on a display of the vehicle infotainment system or a display of the smartwatch, the user interface for soliciting information from a user regarding a desired time for scheduling delivery of a medicament bolus from a medicament delivery device;
based on information received via the user interface, with the processor,
determining that a user wishes to schedule the delivery of a medicament bolus from the medicament delivery device for a future time;
responsive to the determining, beginning scheduling of the medicament bolus delivery by forwarding an instruction from the vehicle infotainment system or the smartwatch to a management device to instruct the medicament delivery device to schedule the delivery of the medicament bolus to the user for a future time,
wherein the management device is a handheld device and wherein the management device controls delivery of medicament by the medicament delivery device;
with the processor, causing an additional user interface to be displayed on the display, the additional user interface including at least one element that is activatable to modify the scheduled delivery of the medicament bolus; and
based on input received via the at least one element of the additional user interface, with the processor, sending an instruction from the smartwatch or the vehicle infotainment system to the management device to command modifying of the scheduled delivery of the medicament bolus by the medicament delivery device.

11. The method of claim 10, wherein the modifying comprises modifying a date and/or a time at which the medicament delivery device is scheduled to deliver the medicament bolus.

12. The method of claim 10, wherein the modifying comprises modifying a dosage amount of the scheduled delivery of the medicament bolus.

13. The method of claim 10, wherein the modifying comprises canceling the scheduled delivery of the medicament bolus.

14. The method of claim 10, further comprising displaying on the display a reminder of the scheduled delivery of a medicament bolus by the medicament delivery device to the user for the future time, wherein the user interface is incorporated into the reminder.

15. The method of claim 10, further comprising displaying on the display a confirmation of the modifying of the scheduled delivery of the medicament bolus before implementing the modifying.

* * * * *